US009794989B2

(12) United States Patent
Nonaka et al.

(10) Patent No.: US 9,794,989 B2
(45) Date of Patent: Oct. 17, 2017

(54) TERMINAL APPARATUS AND CONTROL METHOD FOR ASSISTIVE COOKING

(71) Applicant: Panasonic Intellectual Property Corporation of America, Torrance, CA (US)

(72) Inventors: Masao Nonaka, Osaka (JP); Takashi Morimoto, Osaka (JP); Yasuhiro Yuki, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 214 days.

(21) Appl. No.: 14/559,775

(22) Filed: Dec. 3, 2014

(65) Prior Publication Data

US 2015/0160624 A1 Jun. 11, 2015

(30) Foreign Application Priority Data

Dec. 6, 2013 (JP) ................................ 2013-253050

(51) Int. Cl.

| | |
|---|---|
| ***G06F 7/00*** | (2006.01) |
| ***H05B 6/68*** | (2006.01) |
| ***H05B 6/64*** | (2006.01) |
| ***H05B 6/66*** | (2006.01) |

(52) U.S. Cl.
CPC ........... *H05B 6/687* (2013.01); *H05B 6/6441* (2013.01); *H05B 6/668* (2013.01)

(58) Field of Classification Search
CPC ............ G08C 2201/20; G08C 2201/50; G08C 2201/33; H05B 6/6441; H05B 6/6435; H05B 6/6438; H04L 12/2814; H04L 12/2816; H04L 12/282; G05B 19/0426; G05B 15/02; H04B 1/202; H04B 1/205
See application file for complete search history.

(56) References Cited

U.S. PATENT DOCUMENTS

| | | | | |
|---|---|---|---|---|
| 6,924,469 B1 * | 8/2005 | Strong | H05B 6/6435 | 219/506 |
| 9,009,216 B2 * | 4/2015 | Hakoda | G11B 27/034 | 709/201 |
| 2003/0139843 A1 * | 7/2003 | Hu | H05B 6/688 | 700/211 |
| 2006/0259183 A1 * | 11/2006 | Hayes | G05B 15/02 | 700/221 |
| 2006/0289498 A1 * | 12/2006 | Chun | H05B 6/6441 | 219/685 |
| 2007/0187396 A1 * | 8/2007 | Kim | H05B 6/688 | 219/702 |

(Continued)

FOREIGN PATENT DOCUMENTS

| | | |
|---|---|---|
| JP | 7-085375 | 3/1995 |
| JP | 11-182850 | 7/1999 |
| JP | 2001-317741 | 11/2001 |

*Primary Examiner* — Darrin Dunn
(74) *Attorney, Agent, or Firm* — Wenderoth, Lind & Ponack, L.L.P.

(57) ABSTRACT

A information processor of a terminal apparatus reads from a memory identification information of a food handling apparatus and a table, identifies a function associated with the identification information of the food handling apparatus received by a information receiver in accordance with the table, and starts up the function.

8 Claims, 13 Drawing Sheets

(56) References Cited

U.S. PATENT DOCUMENTS

| | | | | |
|---|---|---|---|---|
| 2010/0192784 | A1* | 8/2010 | Shim | F24C 7/082<br>99/325 |
| 2016/0119161 | A1* | 4/2016 | Ko | G06F 17/30<br>235/375 |

* cited by examiner

| STORAGE APPARATUS ID | STARTUP TARGET FUNCTION |
| --- | --- |
| A001 | BARCODE READER |
| A002 | CAMERA |
| • • • | • • • |

FIG. 5

| STORAGE APPARATUS ID | TERMINAL APPARATUS ID | STARTUP TARGET FUNCTION |
|---|---|---|
| A001 | B011 | BARCODE READER |
| A002 | B012 | CAMERA |
| • • • | • • • | • • • |

FIG. 8A

| TERMINAL APPARATUS ID | COOKING APPARATUS ID | DEVICE TYPE INFORMATION |
|---|---|---|
| B011 | C021 | MICROWAVE OVEN a |
| B012 | C022 | MICROWAVE OVEN b |
| | C023 | RICE COOKER c |
| | C024 | OVEN d |
| • • • | • • • | • • • |

FIG. 8B

| FOOD INFORMATION | DEVICE TYPE INFORMATION | CONTROL INFORMATION |
|---|---|---|
| FROZEN FOOD a | MICROWAVE OVEN a | RECIPE a |
| CHILLED FOOD b | MICROWAVE OVEN b | RECIPE b |
| | MICROWAVE OVEN c | RECIPE c |
| | OVEN d | RECIPE d |
| • • • | • • • | • • • |

TERMINAL APPARATUS AND CONTROL METHOD FOR ASSISTIVE COOKING

CROSS REFERENCES TO RELATED APPLICATIONS

This application claims priority to Japanese Patent Application No. 2013-253050, filed on Dec. 6, 2013, the contents of which are hereby incorporated by reference.

BACKGROUND

1. Technical Field

The present invention relates to a terminal apparatus, and a control method therefor.

2. Description of the Related Art

Japanese Unexamined Patent Application Publication Nos. 11-182850 and 2001-317741 disclose techniques to acquire information related to food from a barcode or an integrated circuit (IC) tag attached to a package or a container of the food (hereinafter referred to as food information). The food information is used to cook food with a cooking apparatus, for example.

SUMMARY

The disclosure is directed to time saving of a user of a terminal apparatus to manually start up a function corresponding to identification information of a food handling apparatus.

According to an aspect of the disclosure, a terminal apparatus in communication with a food handling apparatus configured to keep in storage or cook food, includes a memory configured to store a table that associates identification information of the food handling apparatus with a function to be started by the terminal apparatus, an information receiver configured to receive the identification information of the food handling apparatus transmitted from the food handling apparatus if a predetermined change is detected in the food handling apparatus, and an information processor configured to cause the memory to store the identification information of the food handling apparatus received by the information receiver. The information processor reads from the memory the identification information of the food handling apparatus and the table, identifies the function associated with the identification information of the food handling apparatus received by the information receiver in accordance with the table, and starts up the function.

A general or specific example of the aspect may be implemented using a system, a method, and a computer program or may be implemented by the system, the method, and the computer program in combination.

BRIEF DESCRIPTION OF THE DRAWINGS

FIG. 5 illustrates an example of a table of another embodiment of the disclosure;

FIGS. 8A and 8B illustrate examples of a table of another embodiment of the disclosure;

DETAILED DESCRIPTION

Figure 1:
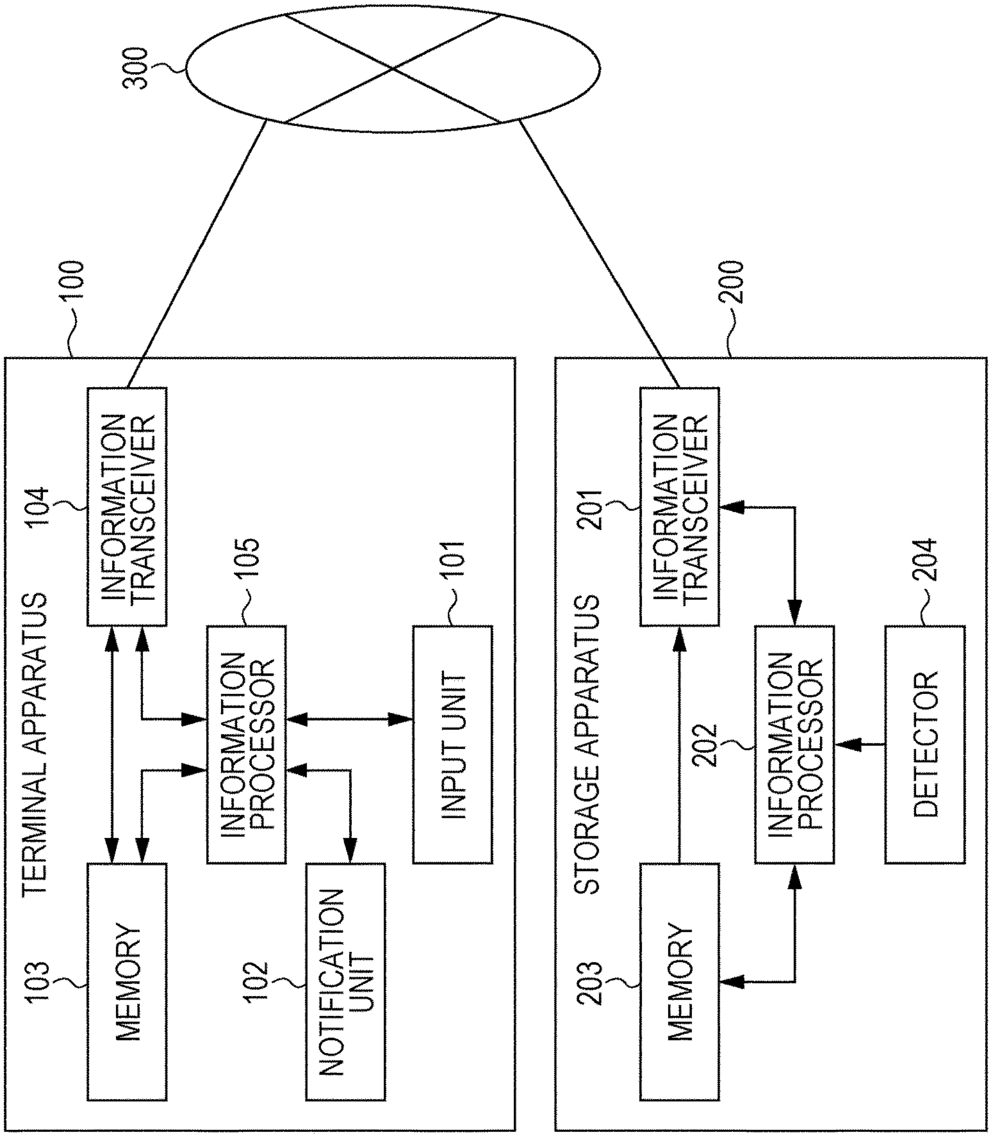
FIG. 1 illustrates a configuration of a cooking assisting system of an embodiment of the disclosure.

Technical items the inventors of the disclosure have studied to develop embodiments are described.

Underlying Information of Disclosure

A microwave oven disclosed in Japanese Unexamined Patent Application Publication No. 11-182850 needs an input unit configured to input a numerical value of Japanese article number code (JAN code) corresponding to information related to food. This results in a complex structure in the microwave oven. JAN code is a value of multiple digit number, and inputting such a code inconveniences a user.

A microwave oven disclosed in Japanese Unexamined Patent Application Publication No. 2001-317741 needs a contactless IC tag reader, and is thus complex in structure.

Many of the food handling apparatuses configured to keep in storage or cook food have recently been provided with communication functions. Terminal apparatuses, such as a smart phone or a tablet, include a device, such as a camera, a barcode reader, or an IC tag reader. The terminal apparatus stores an application program (hereinafter simply referred to as an application) to use such a device, and starts up the application to read the barcode or the IC tag.

The use of the function of the terminal apparatus to retrieve the food information makes it unnecessary to arrange a complex structure in the food handling apparatus.

In Japanese Unexamined Patent Application Publication Nos. 11-182850 and 2001-317741, there is no mention of any study related to a cooperation between the food handling apparatus used by a user and the terminal apparatus.

Apart from these techniques, one type of service called cloud service has been under study. As one example currently under study, information related to a change in the food handling apparatus is transmitted from the food handling apparatus to a server apparatus that provides cloud service and a service matching a terminal apparatus used by the user is thus provided using the transmitted information.

However, such techniques need to be further studied and improved toward practical use. Particularly, there is no specific cloud system under study that makes use of a change in the food handling apparatus.

The inventors of the disclosure have studied a cooking assisting system using a food handling apparatus having a communication function, and a terminal apparatus enabled to retrieve food information, and a cooking assisting system including the food handling apparatus having the communication function, the terminal apparatus enabled to retrieve the food information, and a server apparatus in communication with the food handling apparatus and the terminal apparatus.

A user who uses the terminal apparatus may perform a manual operation to start up a function corresponding to the food handling apparatus. The inventors have paid attention to the possibility that the user might not bother to use the terminal apparatus because of the complex manual operation.

The disclosure provides a terminal apparatus that assists the user in cooking, and sets the user who uses the terminal apparatus free from time and inconvenience involved in starting up the function of the terminal apparatus corresponding to the food handling apparatus. The disclosure also provides a control method of the terminal apparatus, a storage apparatus, a server apparatus, a control method of the server apparatus, and a computer program.

According to one aspect of the disclosure, a terminal apparatus in communication with a food handling apparatus that keeps in storage or that cooks food, includes a memory that stores a table that associates identification information of the food handling apparatus with a function to be started by the terminal apparatus, an information receiver that receives the identification information of the food handling apparatus transmitted from the food handling apparatus if a predetermined change is detected in the food handling apparatus, and an information processor that causes the memory to store the identification information of the food handling apparatus received by the information receiver. The information processor reads from the memory the identification information of the food handling apparatus and the table, identifies the function associated with the identification information of the food handling apparatus received by the information receiver in accordance with the table, and starts up the function.

In this configuration, the user who uses the terminal apparatus is set free from time and inconvenience involved in manually starting up the function of the terminal apparatus associated with the identification information of the food handling apparatus.

According to another aspect of the disclosure, a terminal apparatus in communication with a first server apparatus, includes an information receiver that receives startup information transmitted from the first server, the startup information indicating a function of the terminal apparatus to be started up, the first server storing a table that associates identification information of a food handling apparatus with a function to be started by a terminal apparatus, the food handling apparatus that keeps in storage or that cooks food, and an information processor that causes a memory to store the startup information received by the information receiver. The information processor reads the startup information from the memory, and starts up the function in accordance with the startup information. The startup information is generated, by the first server, as information causing the processor of the terminal apparatus to execute starting up the function. The function to be started up in the terminal device is identified by the first server, the identified function is associated with the identification information, in the table, which corresponds to identification information transmitted from the food handling apparatus to the first server if a predetermined change is detected in the food handling apparatus.

In this configuration, the user who uses the terminal apparatus is free from time and inconvenience involved in manually starting up the function corresponding to the identification information of the food handling apparatus.

In the terminal apparatus according to another aspect of the disclosure, the function to be started up in the terminal apparatus may include a function to acquire food information related to the food.

In this configuration, the user who uses the terminal apparatus is free from time and inconvenience involved in manually starting up the function of the terminal apparatus that acquires the food information related to food. The user may thus perform optimum cooking based on the food information as expected by a food company or a cooking apparatus manufacturer.

According to another aspect of the disclosure, the terminal apparatus further includes an information transmitter that transmits to the first server apparatus the food information acquired through the function. The first server apparatus uses the food information to identify control information to control an operation of the food handling apparatus. The first server apparatus transmits the control information via the terminal apparatus or directly to the food handling apparatus.

In this configuration, the control information identified by the food information is transmitted to the food handling apparatus. The user may thus perform optimum cooking based on the food information as expected by a food company or a cooking apparatus manufacturer.

According to another aspect of the disclosure, the terminal apparatus further includes an information transmitter that transmits to a second server apparatus the food information acquired through the function. The second server apparatus uses the food information to identify control information to control an operation of the food handling apparatus. The second server apparatus transmits the control information via the terminal apparatus or directly to the food handling apparatus.

In the configuration, the control information identified by the food information is transmitted to the food handling apparatus. The user may thus perform optimum cooking based on the food information as expected by a food company or a cooking device manufacturer.

According to another aspect of the disclosure, a terminal apparatus as a storage apparatus that keeps food in storage includes a detector that detects a change in the storage apparatus, an information processor that reads identification information of the storage apparatus from a memory if the change is detected, and an information transmitter that transmits the identification information of the storage apparatus to a predetermined server apparatus. The terminal apparatus or the server apparatus uses the identification information of the storage apparatus to identify the function to be started up in the terminal apparatus.

Upon receiving the transmitted identification information of the storage apparatus in the configuration, the terminal apparatus or the server apparatus may identify the function to be started up in the terminal apparatus.

According to another aspect of the disclosure, a server apparatus, in communication with a terminal apparatus and a food handling apparatus that keeps in storage or that cooks food, includes a memory that stores a table that associates identification information of the food handling apparatus with a function to be started up in the terminal apparatus, an information transceiver that receives the identification information of the food handling apparatus transmitted from the food handling apparatus if a predetermined change is detected in the food handling apparatus, and an information processor that causes the memory to store the identification information of the food handling apparatus received by the information transceiver. The information processor reads from the memory the identification information of the food handling apparatus and the table, identifies the function associated with the identification information of the food handling apparatus received by the information transceiver in accordance with the table, generates startup information to start up the function, and transmits the startup information to the terminal apparatus via the information transceiver.

In the configuration, the terminal apparatus having received the transmitted startup information starts up the function in response to the startup information. The user who uses the terminal apparatus is thus free from time and inconvenience involved in manually starting up the function corresponding to the identification information of the food handling apparatus.

According to another aspect of the disclosure, a control method of a terminal apparatus in communication with a food handling apparatus that keeps in storage or that cooks food, includes storing in a memory in the terminal apparatus a table that associates identification information of the food handling apparatus with a function to be started up in the terminal apparatus, receiving the identification information of the food handling apparatus transmitted from the food handling apparatus if a predetermined change is detected in the food handling apparatus, causing the memory to store the received identification information of the food handling apparatus, reading from the memory the identification information of the food handling apparatus and the table, identifying the function associated with the received identification information of the food handling apparatus in accordance with the table, and starting up the function.

In this configuration, the user who uses the terminal apparatus is free from time and inconvenience involved in manually starting up the function corresponding to the identification information of the food handling apparatus.

According to another aspect of the disclosure, a control method of a terminal apparatus in communication with a first server apparatus includes receiving startup information transmitted from the first server apparatus, the startup information indicating a function of the terminal apparatus to be started up, the first server storing a table that associates identification information of a food handling apparatus with a function to be started by a terminal apparatus, the food handling apparatus that keeps in storage or that cooks food, and causing a memory to store the received startup information. The control method includes reading the stored startup information, and starting up the function in accordance with the startup information. The startup information is generated, by the first server apparatus, as information causing the processor of the terminal apparatus to execute starting up the function. The function to be started up in the terminal device is identified by the first server apparatus. The identified function is associated with the identification information, in the table, which corresponds to identification information transmitted from the food handling apparatus to the first server apparatus if a predetermined change is detected in the food handling apparatus.

In this configuration, the user who uses the terminal apparatus is free from time and inconvenience involved in manually starting up the function corresponding to the identification information of the food handling apparatus.

Another aspect of the disclosure is related to a non-transitory recording medium recording a computer program. The computer program causes a computer to execute the steps. The computer communicates with a food handling apparatus that keeps in storage or that cooks food. The computer program includes storing in a memory a table that associates identification information of the food handling apparatus with a function to be started in the computer, receiving the identification information of the food handling apparatus transmitted from the food handling apparatus if a predetermined change is detected in the food handling apparatus, and causing the memory to store the received identification information of the food handling apparatus, reading from the memory the identification information of the food handling apparatus and the table, identifies the function associated with the received identification information of the food handling apparatus in accordance with the table, and starting up the function.

In this configuration, the user who uses the computer is free from time and inconvenience involved in manually starting up the function corresponding to the identification information of the food handling apparatus.

Another aspect of the disclosure is related to a non-transitory recording medium recording a computer program. The computer program causes a computer to execute the steps. The computer communicates with a first server apparatus. The computer program includes receiving startup information transmitted from the first server apparatus, the startup information indicating a function of the computer to be started up, the first server apparatus storing a table that associates identification information of a food handling apparatus with a function to be started by a computer apparatus, the food handling apparatus that keeps in storage or that cooks food, causing a memory in the computer to store the received startup information, reading the startup information from the memory, and starting up the function in accordance with the startup information. The startup information is generated, by the first server apparatus, as information causing a processor in the computer to execute starting up the function to be started up. The function to be started up in the computer is identified by the first server apparatus, the identified function is associated with the identification information, in the table, which corresponds to identification information transmitted from the food handling apparatus to the first server apparatus if a predetermined change is detected in the food handling apparatus.

In this configuration, the user who uses the computer is free from time and inconvenience involved in manually starting up the function corresponding to the identification information of the food handling apparatus.

The inventors of the disclosure have studied a food handling apparatus having a communication function, a terminal apparatus enabled to retrieve food information, and a cooking assisting system including the food handling apparatus, the terminal apparatus, and a server apparatus configured to transmit control information to control the food handling apparatus in accordance with the food information.

A user who uses the terminal may perform a manual operation to transmit control information to the food handling apparatus to control the food handling apparatus. The inventors have paid attention to the possibility that the user might not bother to transmit the control information.

The disclosure provides a terminal apparatus that assists the user in cooking, and sets the user who uses the terminal apparatus free from time and inconvenience involved in transmitting the control information to the food handling apparatus to control the food handling apparatus. The disclosure also provides a control method of the terminal apparatus, a storage apparatus, a server apparatus, a control method of the server apparatus, and a computer program.

According to another aspect of the disclosure, a terminal apparatus communicating with a first server apparatus and controlling one or more food handling apparatuses each of which keeps in storage or cooks food, includes an information transmitter that transmits, to the first server apparatus, food information related to food, an information receiver that receives at least one piece of control information that is transmitted by the first server apparatus to control an operation, of the one or more food handling apparatuses, identified by the food information in the first server apparatus, and configured to receive identification information of the food handling apparatus transmitted from the one or more food handling apparatuses if a predetermined change is detected in the one or more food handling apparatuses, and an information processor that identifies a first food handling apparatus corresponding to the identification information received first by the information receiver after the information transmitter transmits the food information, and configured to identify first control information corresponding to the first food handling apparatus out of the at least one piece of control information. The information transmitter further transmits the first control information to the first food handling apparatus identified by the information processor.

In this configuration, the user who uses the terminal apparatus is free from time and inconvenience involved in transmitting the first control information to the first food handling apparatus to control the first food handling apparatus.

According to another aspect of the disclosure, a control method of a terminal apparatus communicating with a first server apparatus and controlling one or more food handling apparatuses each of which keeps in storage or cooks food, includes transmitting, to the first server apparatus, food information related to food, receiving from the first server apparatus at least one piece of control information that controls an operation, of the one or more food handling apparatuses, identified by the food information in the first server apparatus, receiving identification information of a first food handling apparatus from the first food handling apparatus where a predetermined change is first detected from among the one or more food handling apparatuses after the food information is transmitted to the first server apparatus, identifying first control information corresponding to the first food handling apparatus out of the at least one piece of control information, and transmitting the first control information to the first food handling apparatus.

In this configuration, the user who uses the terminal apparatus is free from time and inconvenience involved in transmitting the first control information to the first food handling apparatus to control the first food handling apparatus.

Another aspect of the disclosure is related to a non-transitory recording medium recording a computer program. The computer program causes a computer to execute the steps. The computer communicates with a first server apparatus and control one or more food handling apparatuses each of which keeps in storage or cooks food. The computer program includes transmitting, to the first server apparatus, food information related to food, receiving from the first server apparatus at least one piece of control information that controls an operation, of the one or more food handling apparatuses, identified by the food information in the first server apparatus, receiving identification information of a first food handling apparatus from the first food handling apparatus where a predetermined change is first detected from among the one or more food handling apparatuses after the food information is transmitted to the first server apparatus, identifying first control information corresponding to the first food handling apparatus out of the at least one piece of control information, and transmitting the first control information to the first food handling apparatus.

In this configuration, the user who uses the computer is from time and inconvenience involved in transmitting the first control information to the first food handling apparatus to control the first food handling apparatus.

According to another aspect of the disclosure, a server apparatus in communication with a terminal apparatus and one or more food handling apparatuses each of which keeps in storage or cooks food, includes an information receiver that receives food information related to food and acquired by the terminal apparatus, and that receives identification information of a first food handling apparatus from the first food handling apparatus where a predetermined change is first detected out of the one or more food handling apparatuses after the food information is received, and an information processor that identifies first control information corresponding to the food information and the first food handling apparatus, out of at least one piece of control information that is stored on the server apparatus to control an operation of the one or more food handling apparatuses. The first control information is transmitted to the first food handling apparatus.

In this configuration, the user who uses the terminal apparatus is free from time and inconvenience involved in transmitting the first control information to the first food handling apparatus to control the first food handling apparatus.

According to another aspect of the disclosure, a control method of a server apparatus in communication with a terminal apparatus and one or more food handling apparatuses each of which keeps in storage or cooks food, includes receiving food information related to food and acquired by the terminal apparatus, receiving identification information of a first food handling apparatus from the first food handling apparatus where a predetermined change is first detected out of the one or more food handling apparatuses after the food information is received, identifying first control information corresponding to the food information and the first food handling apparatus, out of at least one piece of control information that is stored on the server apparatus to control an operation of the one or more food handling apparatuses, and transmitting the first control information to the first food handling apparatus.

In this configuration, the user who uses the terminal apparatus is free from time and inconvenience involved in transmitting the first control information to the first food handling apparatus to control the first food handling apparatus.

Another aspect of the disclosure is related to a non-transitory recording medium recording a computer program. The computer program causes a computer to execute the steps. The computer communicates with a terminal apparatus and one or more food handling apparatuses each of which keeps in storage or cooks food. The computer program includes receiving food information related to food and acquired by the computer, receiving identification information of a first food handling apparatus from the first food handling apparatus where a predetermined change is first detected out of the one or more food handling apparatuses after the food information is received, identifying first control information corresponding to the food information and the first food handling apparatus, out of at least one piece of control information that is stored on the server apparatus to control an operation of the one or more food handling apparatuses, and transmitting the first control information to the first food handling apparatus.

In this configuration, the user who uses the terminal apparatus is free from time and inconvenience involved in transmitting the first control information to the first food handling apparatus to control the first food handling apparatus.

Embodiments of the disclosure are described with reference to the drawings.

The embodiments described below are specific examples of the disclosure. Values, shapes, materials, elements, mounting locations, connection form, steps, and order of steps in the embodiments are described for exemplary purposes only, and are not intended to limit the disclosure. Among the elements in the embodiment, elements not described in the independent claims indicative of higher concepts may be any arbitrary element. The embodiments may also be combined.

First Embodiment

An example of a configuration of a cooking assisting system as a first embodiment of the disclosure is described below. FIG. 1 is a block diagram illustrating a configuration of a cooking assisting system of the first embodiment of the disclosure.

Referring to FIG. 1, the cooking assisting system of the first embodiment includes a terminal apparatus 100 and a storage apparatus 200 configured to keep food in storage.

Referring to FIG. 1, the terminal apparatus 100 is connected to the storage apparatus 200 via a network 300. The network 300 may be a radio network, a wired network, or a combination thereof. For example, the terminal apparatus 100 may be connected to the storage apparatus 200 via a local area network (LAN) or Bluetooth (registered trademark).

The terminal apparatus 100 may be an information processing apparatus, such as a smart phone or a tablet. FIG. 1 illustrates only a single terminal apparatus 100, but two or more terminal apparatuses 100 may be employed.

The terminal apparatus 100 includes an input unit 101, a notification unit 102, a memory 103, an information transceiver 104, and an information processor 105.

The input unit 101 may include an input device, such as a button or a touchpanel.

The notification unit 102 may include a display device, such as a display, or an output device, such as a loudspeaker.

The memory 103 includes a memory device, such as a hard disk. The memory 103 stores a terminal apparatus identification (ID) as identification information unique to the terminal apparatus 100. The memory 103 also stores a first table.

Figures 2, 3:
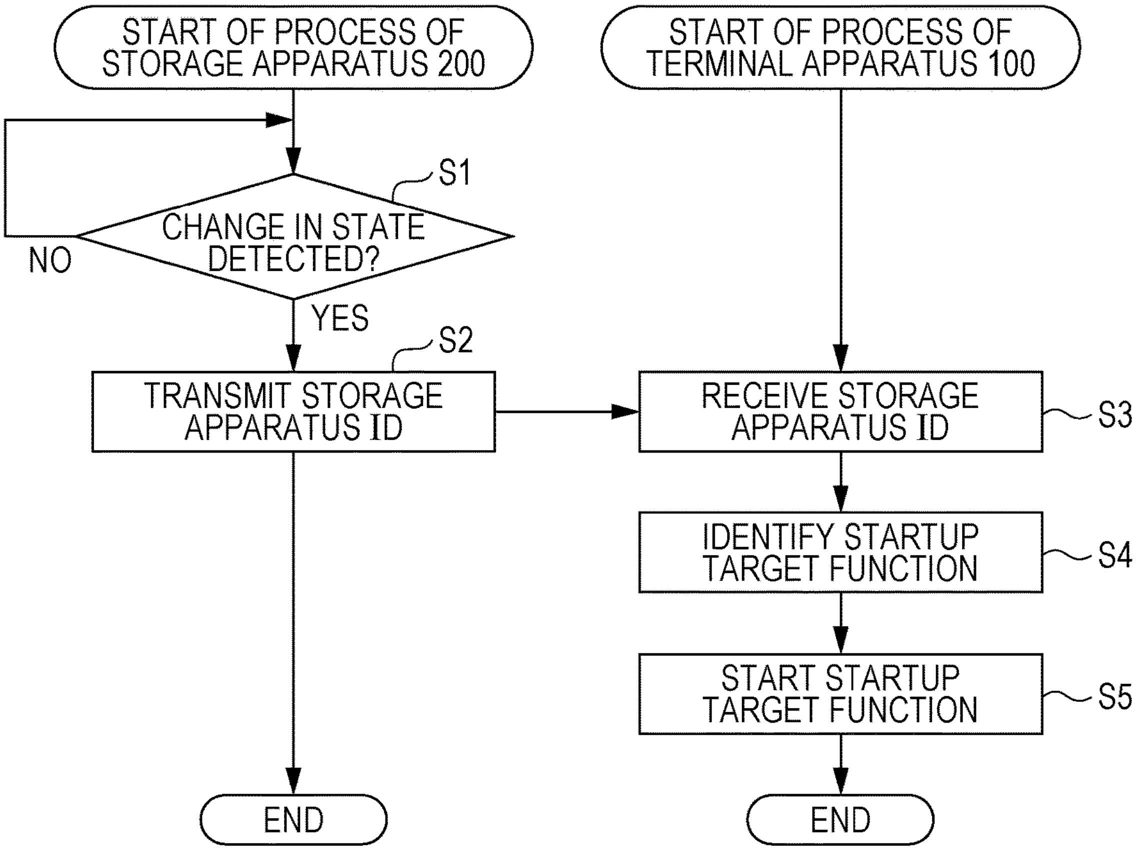
FIG. 2 illustrates an example of a table of the embodiment of the disclosure.
FIG. 3 is a sequence chart illustrating an example of operation of the cooking assisting system of the embodiment of the disclosure.

An example of the first table is described with reference to FIG. 2. FIG. 2 illustrates an example of the first table stored in the memory 103.

As illustrated in FIG. 2, the first table lists information related to a storage apparatus ID, and a startup target function. Each piece of the information is pre-registered by a user who uses the terminal apparatus 100.

The storage apparatus ID is identification information unique to the storage apparatus 200. As illustrated in FIG. 2, for example, storage apparatus IDs "A001" and "A002" are registered. As described below, the storage apparatus ID in the first table indicates the storage apparatus ID stored in the memory 203 of the storage apparatus 200.

The startup target function is information registered in association with the storage apparatus ID, and indicating the function started up in the terminal apparatus 100. The term function herein refers to a function of retrieving information related to food (information identifying food or a product, and hereinafter referred to as food information). The function of retrieving the information related to food is implemented by executing an application using a device included in the terminal apparatus 100. The application is stored in the memory 103. Referring to FIG. 2, a "barcode reader" and a "camera" are registered. An application to read a barcode using a barcode reader (hereinafter referred to as a barcode application) and an application to read a barcode using a camera (hereinafter referred to as a camera application) are stored in the memory 103. If in addition to these applications, an application to perform voice recognition using a microphone (hereinafter referred to as a microphone application), an application to read an IC tag using an IC tag reader (hereinafter referred to as an IC tag reader application) are stored in the memory 103, the "microphone" and the "IC tag reader" may be registered as the startup target functions in the first table.

An example of the first table of the memory 103 has been described.

The storage apparatus ID is transmitted from the storage apparatus 200 to the terminal apparatus. The information transceiver 104 receives the storage apparatus ID. The received storage apparatus ID is stored in the memory 103.

The information transceiver 104 is a communication interface that transmits information to another apparatus and receives information transmitted from another apparatus. For example, the information transceiver 104 receives the storage apparatus ID from the storage apparatus 200.

The information processor 105 is a control device, such as a processor, performing a variety of processes on information. The information processor 105 reads the storage apparatus ID (received via the information transceiver 104) and the first table from the memory 103. The information processor 105 references the first table to identify the startup target function associated with the read storage apparatus ID. The information processor 105 starts up the function indicated by the identified startup target function.

The storage apparatus 200 (an example of the food handling apparatus) may be a storage device, a refrigerator, or a freezer, for keeping food in storage. The term food herein refers to processed foods (frozen foods, chilled foods, or room temperature foods), or food ingredients (such as meats, seafood, vegetables, or fruits), drink, or flavoring agents. Food may or may not be wrapped up.

The storage apparatus 200 includes an information transceiver 201, an information processor 202, a memory 203, and a detector 204.

The information transceiver 201 is a communication interface that transmits information to another apparatus while receiving information from another apparatus. The information transceiver 201 transmits the storage apparatus ID stored in the memory 203 to the terminal apparatus 100. The storage apparatus ID is information unique to the storage apparatus 200 as described above.

The information processor 202 is a control device, such as processor, executing a variety of processes on information. Upon receiving a predetermined detected signal from the detector 204 to be discussed later, the information processor 202 reads the storage apparatus ID from the memory 203. The information processor 202 instructs the transceiver 201 to transmit the read storage apparatus ID to the terminal apparatus 100.

The memory 203 is a memory device, such as a hard disk or one or more memories. The storage apparatus ID unique to the storage apparatus 200 is stored in the memory 203. The storage apparatus ID is associated with a terminal apparatus ID serving as a destination of the storage apparatus ID. Upon reading the storage apparatus ID, the information processor 202 recognizes the terminal apparatus serving as the destination of the storage apparatus ID. In this example, the storage apparatus ID of the storage apparatus 200 is associated with the terminal apparatus ID of the terminal apparatus 100.

The detector 204 is a detector device configured to detect a predetermined change in the storage apparatus 200.

The detector 204 may now be a sensor that detects the opening of a door of the storage apparatus 200 (an example of a change). In such a case, upon detecting the opening of the door, the detector 204 determines that food has been taken out of the storage apparatus 200 and then outputs a detected signal to the information processor 202.

The detector 204 may now be a sensor that detects an increase in illumination in the storage apparatus 200 (an example of a change). In such a case, upon detecting an increase in the illumination in the storage apparatus 200, the detector 204 determines that food has been taken out of the storage apparatus 200 and outputs a detected signal to the information processor 202.

The detector 204 may now be a sensor that detects a decrease in the weight of content inside the storage apparatus 200 (an example of a change). In such a case, upon detecting a decrease in the weight of the storage apparatus 200, the detector 204 outputs a detected signal to the information processor 202.

The detector 204 may now be a button that is configured to be pressed by a user (an example of a change). If the button is pressed by the user, the detector 204 determines that food is taken out of the storage apparatus 200 and outputs a detected signal to the information processor 202. The button herein is a device arranged at a predetermined location of the storage apparatus 200, and is configured to be pressed when the user takes food out of the storage apparatus 200. In the first embodiment, the button is pressed. Another kind of action may be performed on the button.

An example of a cooking assisting process of the cooking assisting system of the embodiment is described below. FIG. 3 is a sequence chart illustrating an example of operation of the cooking assisting system of the embodiment.

In step S1, the information processor 202 in the storage apparatus 200 determines whether the detector 204 had detected a change (namely, whether a detected signal has been received from the detector 204).

If no change has been detected in step S1 (no branch from step S1), processing returns to step S1. If a change has been detected (yes branch from step S1), processing proceeds to step S2.

In step S2, the information processor 202 reads the storage apparatus ID from the memory 203, and instructs the transceiver 201 to transmit the read storage apparatus ID to the terminal apparatus 100.

In step S3, the information transceiver 104 in the terminal apparatus 100 receive the storage apparatus ID transmitted from the storage apparatus 200. The information processor 105 causes the memory 103 to store the received storage apparatus ID therein.

In step S4, the information processor 105 reads from the memory 103 the storage apparatus ID and the first table. By referencing the first table, the information processor 105 identifies the startup target function associated with the read storage apparatus ID.

In step S5, the information processor 105 starts up the function indicated by the identified startup target function. For example, if the barcode reader is identified as the function indicated by the startup target function, the information processor 105 reads the barcode application from the memory 103 and starts up the barcode application. The barcode application is thus available for use in the terminal apparatus 100. Using the barcode application, the user reads a barcode attached to the food (or the wrapping of the food) taken out of the storage apparatus 200.

In the cooking assisting system of the embodiment, a predetermined function of the terminal apparatus 100 (for example, food information retrieval function) is triggered by the detection of a change in the storage apparatus 200. In this way, the terminal apparatus 100 starts up the predetermined function without a manual operation by the user. The user is thus free from time and inconvenience involved in starting up the predetermined function. This leads to nice cooking the food company or the cooking apparatus manufacturer may expect.

In the first embodiment, the terminal apparatus 100 stores the first table of FIG. 2 and identifies the startup target function based on the first table. The disclosure is not limited to this arrangement. The startup target function may be identified with no first table stored on the terminal apparatus 100. For example, the storage apparatus 200 stores the startup target function of the terminal apparatus 100 (such as a table that associates each terminal apparatus ID with a startup target function). Upon detecting a change in the state of the storage apparatus 200, the storage apparatus 200 generates startup information instructing the terminal apparatus 100 to start up the function indicated by the startup target function of the terminal apparatus 100, and then transmits the startup information to the terminal apparatus 100. Upon receiving the startup information from the storage apparatus 200, the terminal apparatus 100 starts up the function specified by the startup information. This operation may be applicable to second through fourth embodiments.

Second Embodiment

A second embodiment of the disclosure is described below. In the first embodiment, the storage apparatus 200 directly communicates with the terminal apparatus 100. In the second embodiment, however, the storage apparatus 200 communicates with the terminal apparatus 100 via a server apparatus 400.

Figure 4:
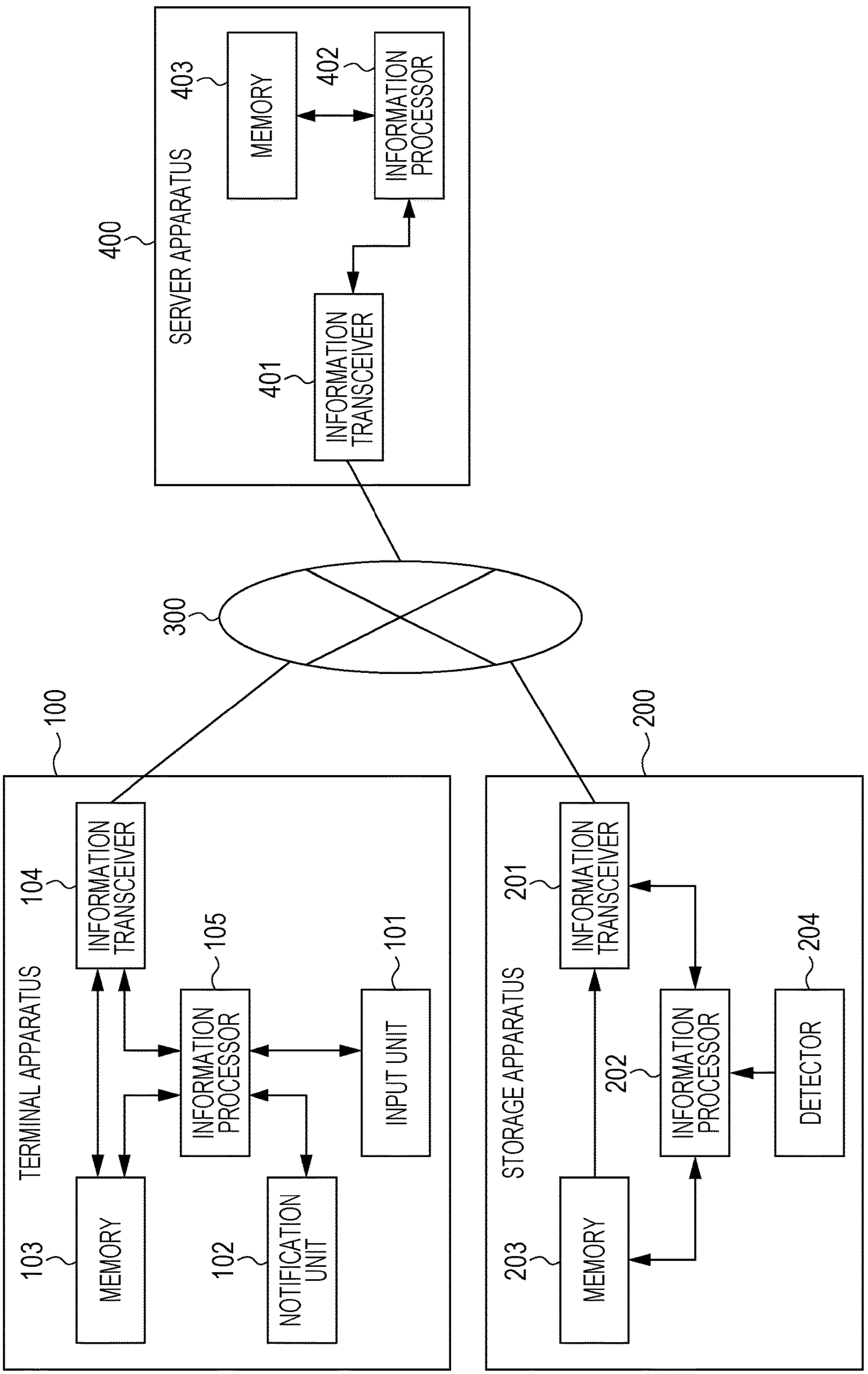
FIG. 4 is a block diagram illustrating an example of a configuration of the cooking assisting system of another embodiment of the disclosure.

An example of the configuration of the cooking assisting system of the second embodiment of the disclosure is described below. FIG. 4 is a block diagram illustrating the example of the configuration of the cooking assisting system of the embodiment of the disclosure. The following discussion mainly focuses on the difference between the first embodiment and the second embodiment.

Referring to FIG. 4, the cooking assisting system of the second embodiment includes the terminal apparatus 100, the storage apparatus 200, and the server apparatus 400.

As illustrated in FIG. 4, the terminal apparatus 100, the storage apparatus 200, and the server apparatus 400 are connected via the network 300. The network 300 may be a radio network, a wired network, or a combination thereof. For example, the terminal apparatus 100 may be connected to the server apparatus 400 via the Internet. The storage apparatus 200 may be connected to the server apparatus 400 via the Internet.

The terminal apparatus 100 of the second embodiment is different from the terminal apparatus 100 of the first embodiment in that the startup target function specified by the received startup information is triggered by reception of the startup information from the server apparatus 400 (as described in detail below). More specifically, in the second embodiment, the information processor 105 causes the memory 103 to store the received startup information when the information transceiver 104 receives the startup information transmitted from the server apparatus 400. The information processor 105 reads from the memory 103 the startup target function indicated by the startup information and starts up the function indicated by the startup target function. For example, if the startup target function specified by the startup information is a barcode reader, the information processor 105 reads a barcode application from the memory 103 and starts up the read barcode application.

The storage apparatus 200 is different from the counterpart in the first embodiment in that the transmission destination of the storage apparatus ID is the server apparatus 400. More specifically, in the second embodiment, the storage apparatus ID stored in the memory 203 is associated with the server apparatus ID of the server apparatus 400 that is the identification information unique to the server apparatus as the transmission destination of the storage apparatus ID. For example, the storage apparatus ID of the storage apparatus 200 is associated with the server apparatus ID of the server apparatus 400. Upon receiving a detected signal from the detector 204, the information processor 202 reads the storage apparatus ID from the memory 103 and instructs the transceiver 201 to transmit the read storage apparatus ID to the server apparatus 400.

The server apparatus 400 receives the storage apparatus ID from the storage apparatus 200, identifies the terminal apparatus and the startup target function based on the storage apparatus ID, and then transmits to the terminal apparatus the startup information instructing the terminal apparatus to start up the function indicated in the identified startup target function.

The server apparatus 400 includes an information transceiver 401, an information processor 402, and a memory 403.

The information transceiver 401 is a communication interface configured to transmit information to another apparatus and receive information from another apparatus. For example, the information transceiver 401 receives the storage apparatus ID from the storage apparatus 200. The information transceiver 401 transmits the startup information generated by the information processor 402 to the terminal apparatus 100.

The information processor 402 is a control device, such as a processor, configured to execute a variety of processes on information. For example, when the information transceiver 401 receives the storage apparatus ID, the information processor 402 causes the memory 403 to store the received storage apparatus ID. The information processor 402 reads from the memory 403 the storage apparatus ID (received by the information transceiver 401) and a second table (to be discussed in detail later). The information processor 402 references the second table, and identifies the terminal apparatus ID associated with the read storage apparatus ID, and the startup target function. The information processor 402 generates the startup information instructing the identified startup target function to be started up. The information processor 402 transmits the generated startup information via the information transceiver 401 to the terminal apparatus (indicated by the identified terminal apparatus ID, herein the terminal apparatus 100).

The memory 403 is a memory device, such as a hard disk or one or more memories. The memory 403 stores the second table.

An example of the second table is described with reference to FIG. 5. FIG. 5 illustrates the example of the second table stored in the memory 403.

Referring to FIG. 5, the second table lists information of the storage apparatus ID, the terminal apparatus ID, and the startup target function. Each of these pieces of information is pre-registered by a user who uses terminal apparatus.

The storage apparatus ID is information unique to the storage apparatus 200. As illustrated in FIG. 5, "A001" and "A002" are registered as the storage apparatus IDs.

The terminal apparatus ID is information registered in association with the storage apparatus ID and is unique to the terminal apparatus 100. As illustrated in FIG. 5, "B011" and "B012" are registered as the terminal apparatus IDs.

The startup target function is information registered in association with the storage apparatus ID and the terminal apparatus ID, and indicates the function to be started up in the terminal apparatus corresponding to the terminal apparatus ID. As illustrated in FIG. 5, a "barcode reader" and a "camera" are registered as the startup target functions.

The example of the second table of the memory 403 has been discussed.

The storage apparatus ID is transmitted from the storage apparatus to the server apparatus 400. The information transceiver 401 receives the storage apparatus ID. The received storage apparatus ID is stored in the memory 403.

Figure 6:
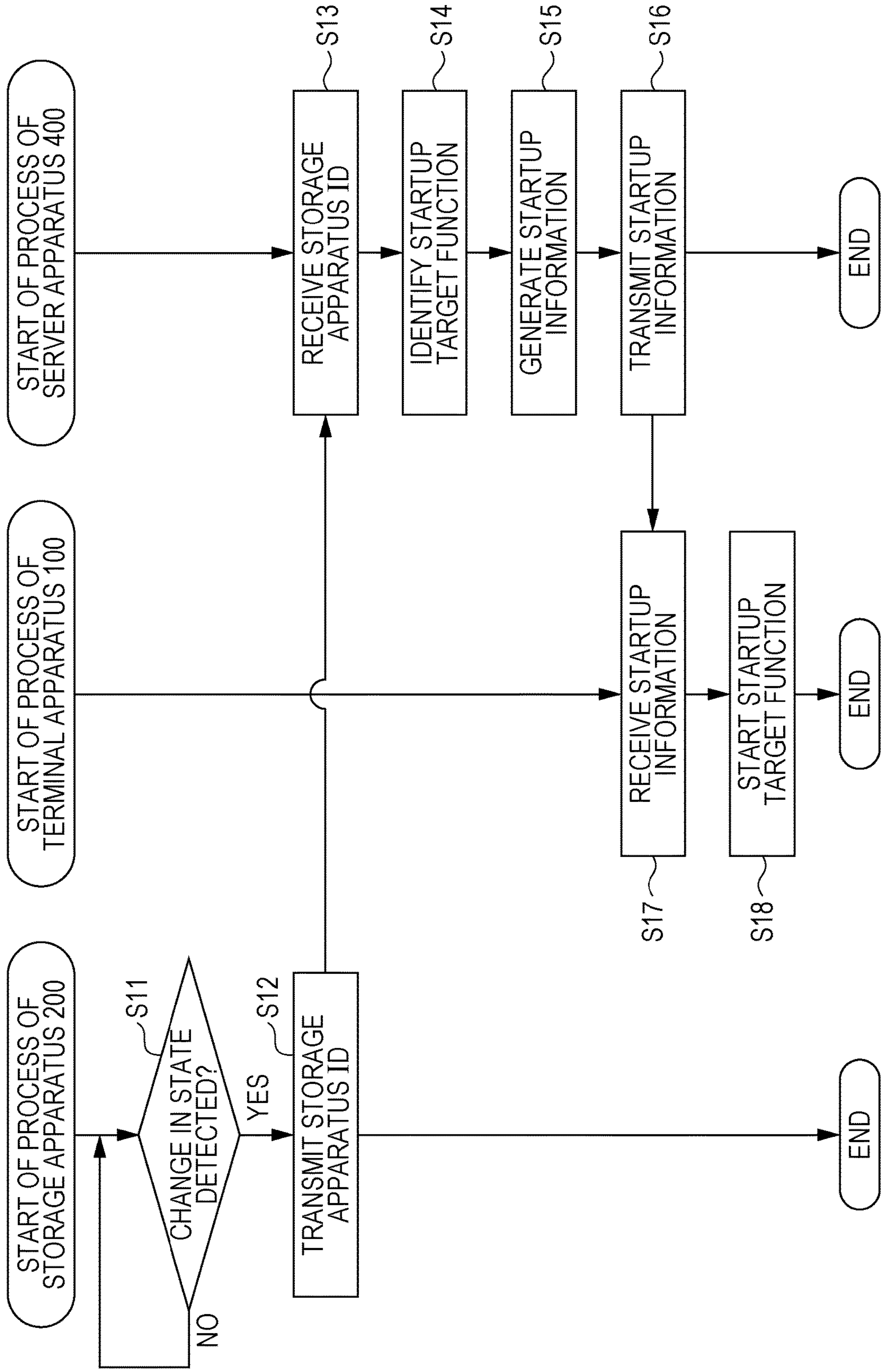
FIG. 6 is a sequence chart illustrating an example of an operation of the cooking assisting system of another embodiment of the disclosure.

An example of the cooking assisting process of the cooking assisting system of the second embodiment is described below. FIG. 6 is a sequence chart illustrating the example of the cooking assisting process of the cooking assisting system of the second embodiment.

Step S11 is identical to step S1 of FIG. 3, and the discussion thereof is omitted herein.

In step S12, the information processor 202 reads the storage apparatus ID from the memory 203, and transmits the read storage apparatus ID via the information transceiver 201 to the server apparatus 400.

In step S13, the information transceiver 401 in the server apparatus 400 receives the storage apparatus ID transmitted from the storage apparatus 200. The information processor 402 causes the memory 403 to store the storage apparatus ID.

In step S14, the information processor 402 reads from the memory 403 the storage apparatus ID and the second table. Referencing the second table, the information processor 402 identifies the terminal apparatus ID and the startup target function associated with the read storage apparatus ID.

In step S15, the information processor 402 generates the startup information that instructs the identified startup target function to be started up. For example, if the identified startup target function is a barcode reader, the information processor 402 generates the startup information instructing the barcode reader to start up. The information processor 402 then recognizes the terminal apparatus indicated by the identified terminal apparatus ID as the transmission destination of the startup information. For example, the identified terminal apparatus ID indicates the terminal apparatus 100.

In step S16, the information processor 402 transmits the generated startup information via the information transceiver 401 to the terminal apparatus 100.

In step S17, the information transceiver 104 in the terminal apparatus 100 receives the startup information transmitted from the server apparatus 400. The information processor 105 causes the memory 103 to store the received startup information.

In step S18, the information processor 105 reads from the memory 103 the startup target function indicated by the startup information, and starts up the function indicated by the read startup target function. For example, if the startup target function specified by the startup information is a barcode reader, the information processor 105 reads the barcode application from the memory 103, and starts up the read barcode reader application. The barcode application is ready to be used in the terminal apparatus 100. The user may read the barcode attached to the food (or the wrapping of the food) taken out of the storage apparatus 200.

The cooking assisting system of the second embodiment provides the same advantageous effects as those of the first embodiment. Since the cooking assisting system of the second embodiment is free from identifying the startup target function with the table stored on the terminal apparatus 100, a smaller memory space of the terminal apparatus 100 works than in the first embodiment, and load on each process is reduced.

Third Embodiment

A third embodiment of the disclosure is described below. In the third embodiment, the predetermined function is started up in the terminal apparatus 100 through the process described with reference to the first and second embodiments, and then food information is acquired using the started function.

Figure 7:
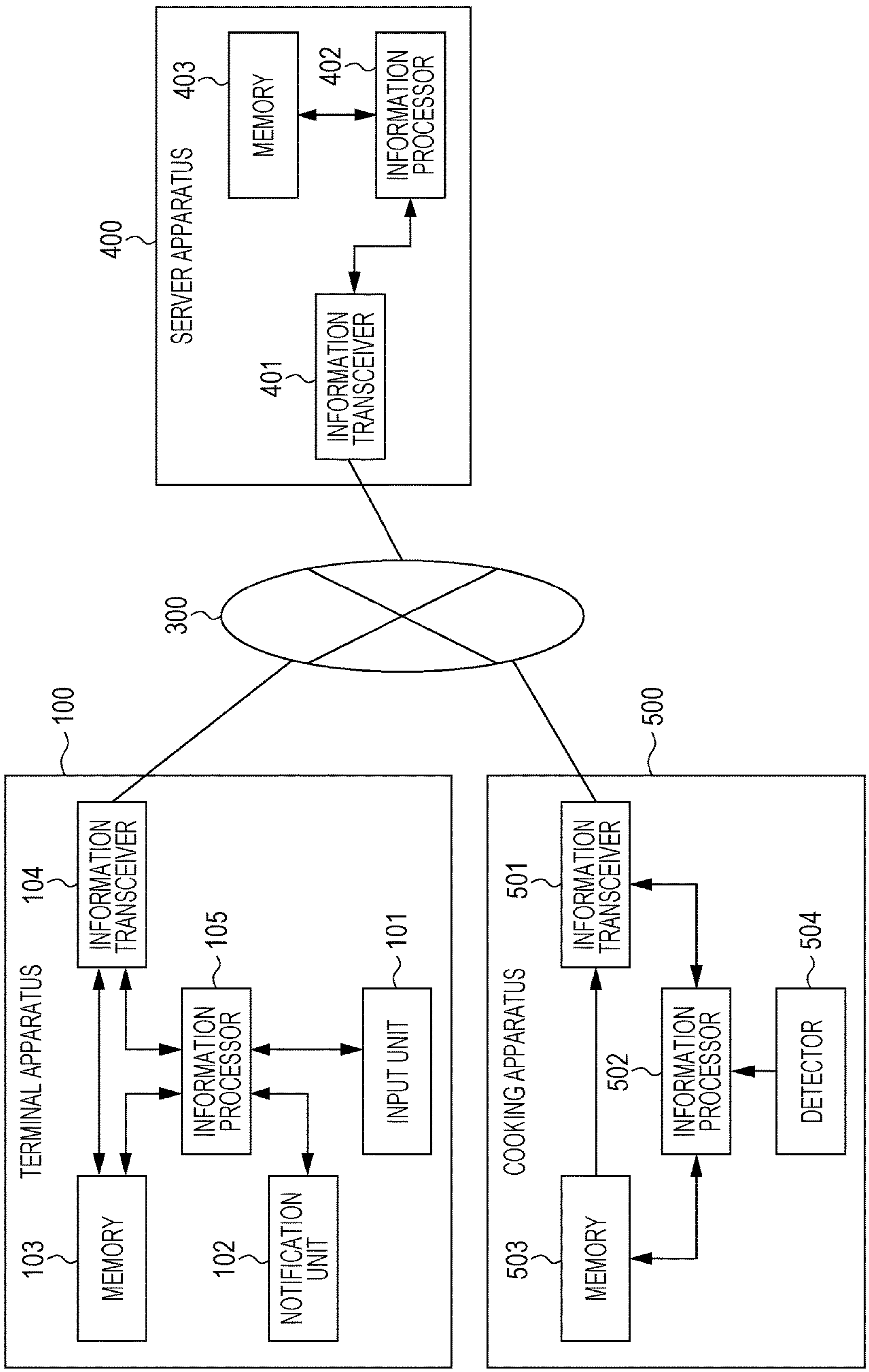
FIG. 7 is a block diagram illustrating an example of a configuration of the cooking assisting system of another embodiment of the disclosure.

An example of the cooking assisting system of the third embodiment of the disclosure is described below. FIG. 7 is a block diagram illustrating the example of the configuration of the cooking assisting system of the third embodiment of the disclosure. The following discussion mainly focuses on the difference from the second embodiment.

Referring to FIG. 7, the cooking assisting system of the third embodiment includes a terminal apparatus 100, a server apparatus 400, and a cooking apparatus 500.

With reference to FIG. 7, the terminal apparatus 100, the server apparatus 400, and the cooking apparatus 500 are connected via the network 300. The network 300 may be a radio network, a wired network, or a combination thereof. The network 300 of FIG. 7 includes multiple networks. More specifically, the terminal apparatus 100 is connected to the server apparatus 400 via the Internet. The terminal apparatus 100 is connected to the cooking apparatus 500 via a local area network (LAN) or Bluetooth (registered trademark).

The terminal apparatus 100 is described below.

The user acquires food information identifying food taken out of the storage apparatus 200 using the function started in the terminal apparatus 100. The function herein is a function started up in one of the first embodiment and the second embodiment. The functions include the barcode application, the camera application, the microphone application, and the IC tag reader application. The food information includes information readable from a barcode or an IC tag attached to the food, a photographed image of the food, or a user's statement (or voice information) about the name of the food or product.

When the food information is acquired in the terminal apparatus 100, the information processor 105 reads the terminal apparatus ID from the memory 103. The terminal apparatus ID is associated with the server apparatus ID that is a transmission destination of the terminal apparatus ID. Upon reading the terminal apparatus ID, the information processor 105 recognizes the server apparatus that becomes the transmission destination of the read terminal apparatus ID. For example, the terminal apparatus ID of the terminal apparatus 100 is associated with the server apparatus ID of the server apparatus 400. The information processor 105 attaches the terminal apparatus ID to the food information and then transmits the food information with the terminal apparatus ID attached thereto via the information transceiver 104 to the server apparatus 400.

When the information transceiver 104 receives control information from the server apparatus 400, the information processor 105 causes the memory 103 to store the received control information. In accordance with the control information, the cooking apparatus 500 performs a predetermined recipe. The control information is transmitted with a cooking apparatus ID attached thereto. The cooking apparatus ID is identification information unique to the cooking apparatus. Upon receiving the control information including the cooking apparatus ID, the information processor 105 waits on standby to receive the cooking apparatus ID transmitted from the cooking apparatus 500.

When the information transceiver 104 receives the cooking apparatus ID from the cooking apparatus 500, the information processor 105 stores the received cooking apparatus ID of the cooking apparatus 500 in the memory 103. The information processor 105 reads from the memory 103 the cooking apparatus ID of the cooking apparatus 500 and the control information, and identifies the control information to which the same cooking apparatus ID as the cooking apparatus ID received from the cooking apparatus 500 is attached. The information processor 105 transmits the identified control information via the information transceiver 104 to the cooking apparatus 500 indicated by the cooking apparatus ID (attached to the identified control information).

The server apparatus 400 is described below.

When the information transceiver 401 in the server apparatus 400 receives the food information with the terminal apparatus ID, of the terminal apparatus 100, attached thereto from the terminal apparatus 100, the information processor 402 stores the received terminal apparatus ID and food information in the memory 403. The information processor 402 identifies the control information based on the stored terminal apparatus ID and food information and a third table and a fourth table stored in the memory 403 (as described in detail below).

Referring to FIGS. 8A and 8B, the third table and fourth table stored in the memory 403 are described. FIG. 8A illustrates an example of the third table, and FIG. 8B illustrates an example of the fourth table.

The third table lists the terminal apparatus ID, the cooking apparatus ID, and device type information as illustrated in FIG. 8A. Each of these pieces of information is pre-registered by the user who uses the terminal apparatus.

The terminal apparatus ID is information unique to the terminal apparatus. For example, "B011" and "B012" are registered as the terminal apparatus IDs as illustrated in FIG. 8A.

The cooking apparatus ID is information that is registered in association with the terminal apparatus ID, and is unique to the cooking apparatus. As illustrated in FIG. 8A, "C021", "C022", "C023", and "C024" are registered as the cooking apparatus IDs. As illustrated in FIG. 8A, the terminal apparatus ID "B011" is associated with the cooking apparatus ID "C021" in a one-to-one correspondence while the terminal apparatus ID "B012" is associated with three cooking apparatus IDs "C022", "C023", and "C024".

The device type information is information that is registered in association with the terminal apparatus ID and indicates the type of the cooking apparatus. As illustrated in FIG. 8A, a "microwave oven a", a "microwave oven b", a "rice cooker c", and an "oven d" are registered. Note that the cooking apparatus ID is associated with the device type information in a one-to-one correspondence in the example of FIG. 8A.

As illustrated in FIG. 8B, the fourth table lists the control information, the device type information, and the control information. Each of these pieces of information is pre-registered by a food company or a cooking apparatus manufacturer.

The food information identifies food or a product. As illustrated in FIG. 8B, "frozen food" and "chilled food" are registered.

The device type information is information that is registered in association with the food information, and indicates the device type of the cooking apparatus. As illustrated in FIG. 8B, for example, a "microwave oven a", a "microwave oven b", a "microwave oven c", and an "oven d" are registered. Referring to FIG. 8B, the food information "frozen food a" is associated with the device type information "microwave oven a" in a one-to-one correspondence while the food information "chilled food b" is associated with three pieces of device type information the "microwave oven b", the "microwave oven c", and the "oven d".

The control information is registered in association with the food information and is used to control the cooking apparatus 500 to perform a predetermined recipe. As illustrated in FIG. 8B, a "recipe a", a "recipe b", a "recipe c", and a "recipe d" are registered. These recipes including information related to cooking conditions (the type of preparation for cooking ingredients, the order of cooking preparations, heating temperature, heating time, the type of heating, and the order of heating). The type of preparation for cooking ingredients includes cutting, mincing, mashing, kneading, and other steps. The order of cooking preparations refers to the order according to which multiple cooking preparations are consecutively performed. The type of heating refers to heating using a microwave oven, steaming, grilling, or using an oven. The order of heating refers to an order according to which multiple types of heating are consecutively performed. The device type information is associated with the control information in a one-to-one correspondence in the example of FIG. 8B.

The third table and the fourth table in the memory 403 have been described.

The information processor 402 attaches the cooking apparatus ID of FIG. 8A to the identified control information, and transmits the control information with the cooking apparatus ID attached thereto via the information transceiver 401 to the terminal apparatus 100 (the transmission destination of the terminal apparatus ID and the food information).

The cooking apparatus 500 (as an example of the food handling apparatus) is an apparatus for cooking food and includes a food processor, a microwave oven, an oven, an electromagnetic cooker, a rice cooker, or a griddle.

The cooking apparatus 500 includes an information transceiver 501, an information processor 502, a memory 503, and a detector 504.

The information transceiver 501 is a communication interface configured to transmit information to another apparatus, and receive information from another apparatus. For example, the information transceiver 501 transmits to the terminal apparatus 100 the cooking apparatus ID stored in the memory 503. The cooking apparatus ID stored in the memory 503 is information unique to the cooking apparatus 500. The information transceiver 501 receives the control information transmitted from the terminal apparatus 100.

The information processor 502 is a control device, such as a processor, configured to execute a variety of processes on information. Upon receiving a predetermined detected signal from the detector 504 to be discussed below, the information processor 502 reads the cooking apparatus ID from the memory 503. The information processor 502 transmits the read cooking apparatus ID via the information transceiver 501 to the terminal apparatus 100. The information processor 502 stores the control information received by the information transceiver 501 in the memory 503. The information processor 502 reads the control information from the memory 503, and executes a cooking action in accordance with the read control information.

The memory 503 is a memory device, such as a hard disk or one or more memories. The memory 503 stores the cooking apparatus ID as information unique to the cooking apparatus 500. The cooking apparatus ID is associated with the terminal apparatus ID that serves as the transmission destination of the cooking apparatus ID. Upon reading the cooking apparatus ID, the information processor 502 recognizes the terminal apparatus that serves as the transmission destination of the read cooking apparatus ID. In one example, the cooking apparatus ID of the cooking apparatus 500 is associated with the terminal apparatus ID of the terminal apparatus 100.

The detector 504 detects a predetermined change in the cooking apparatus 500.

For example, the detector 504 may be a sensor that detects the opening of a door of the cooking apparatus 500 (an example of a change). When the door is opened, the detector 504 determines that food is placed in the cooking apparatus 500 and then outputs a detected signal to the information processor 502.

For example, the detector 504 may be a sensor that detects an increase in the weight of contents inside the cooking apparatus 500 (an example of a change). Upon detecting an increase in the weight of the contents in the cooking apparatus 500, the detector 504 determines that food is placed in the cooking apparatus 500 and then transmits a detected signal to the information processor 502.

The detector 504 may be a sensor that detects a decrease in the illumination inside the cooking apparatus 500 (an example of a change). Upon detecting a decrease in the illumination inside the cooking apparatus 500, the detector 504 determines that food is placed in the cooking apparatus 500 and transmits a detected signal to the information processor 502.

The detector 504 may be a button that is configured to be pressed by the user (an example of a change). When the button is pressed by the user, the detector 504 determines that food is placed in the cooking apparatus 500 and transmits a detected signal to the information processor 502. The button herein is a device that is installed at a predetermined location in the cooking apparatus 500 and is pressed when the user places food in the cooking apparatus 500. In the third embodiment, the button is pressed as an example of a change. Another kind of action on the button may also be acceptable.

Figure 9:
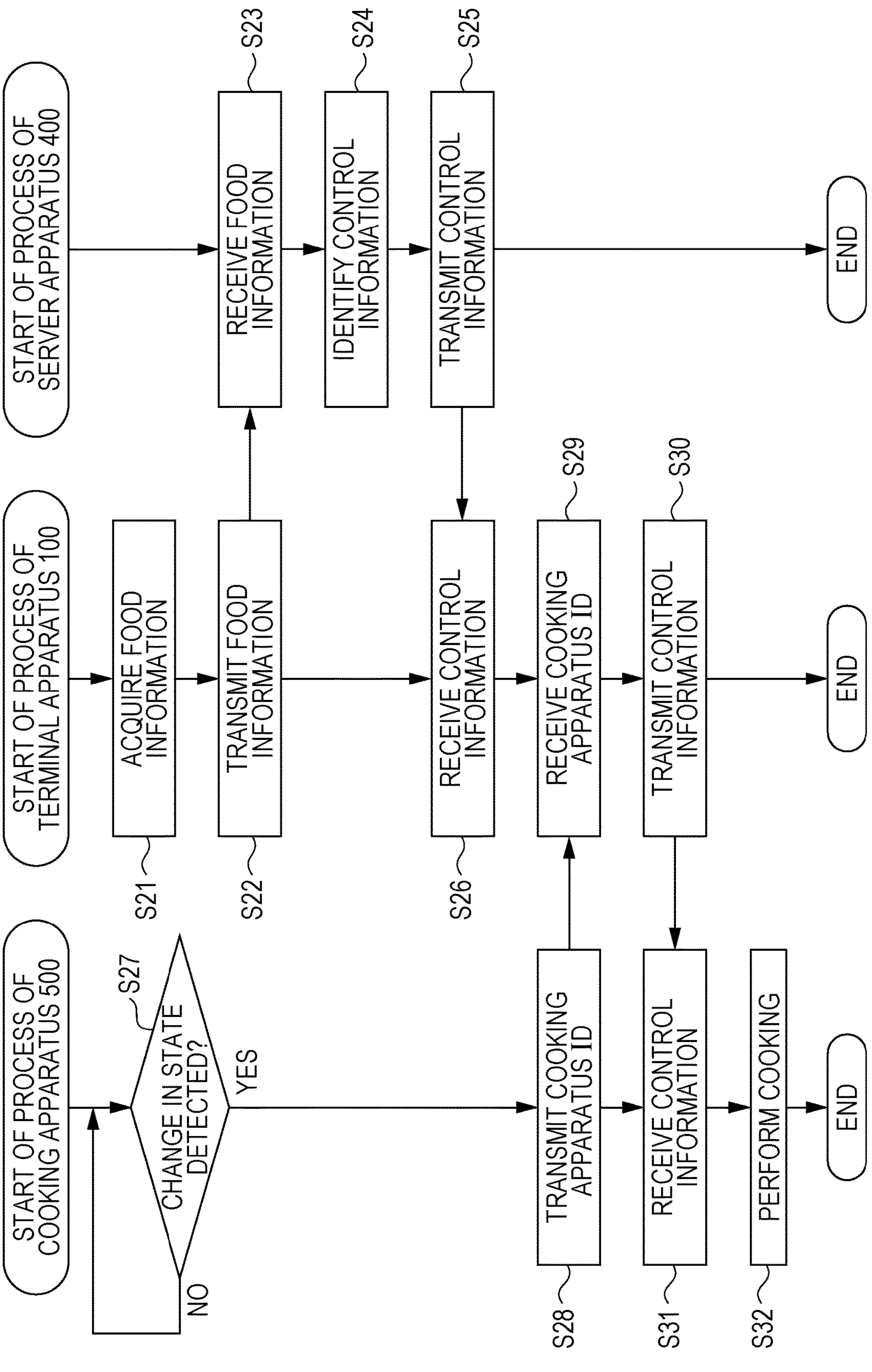
FIG. 9 is a sequence chart illustrating an example of an operation of the cooking assisting system of another embodiment of the disclosure.

An example of a cooking assisting process of the cooking assisting system of the third embodiment is described below. FIG. 9 is a sequence chart illustrating an example of the process of the cooking assisting system of the third embodiment.

In step S21, the information processor 105 in the terminal apparatus 100 acquires the food information identifying a food item from food items taken out of the storage apparatus 200 using the function started up in the terminal apparatus 100.

In step S22, the information processor 105 reads the terminal apparatus ID from the memory 103, attaches the read terminal apparatus ID to the food information, and transmits the food information with the terminal apparatus ID attached thereto via the information transceiver 104 to the server apparatus 400.

In step S23, the information transceiver 401 in the server apparatus 400 receives the food information and the terminal apparatus ID of the terminal apparatus 100 transmitted from the terminal apparatus 100. The information processor 402 stores the received food information and terminal apparatus ID in the memory 403.

In step S24, the information processor 402 reads from the memory 403 the food information, the terminal apparatus ID, the third table, and the fourth table. The information processor 402 identifies the control information to be transmitted to the terminal apparatus 100, based on these pieces of information.

How the control information is identified is specifically described.

As an example of identifying a single piece of the control information, the terminal apparatus ID is "B011", and the food information is "frozen food a". In such a case, the information processor 402 references the third table of FIG. 8A, and the "microwave oven a" is identified as the device type information associated with the terminal apparatus ID "B011". The information processor 402 then references the fourth table of FIG. 8B and identifies the "recipe a". The information processor 402 references the third table of FIG. 8A and attaches the cooking apparatus ID "C021" associated with the terminal apparatus ID "B011" to the control information "recipe a".

As an example of identifying multiple pieces of control information, the terminal apparatus ID is "B012", and the food information is "chilled food b". The information processor 402 references the third table of FIG. 8A and identifies the "microwave oven b", the "rice cooker c", and the "oven d" as the device type information associated with the terminal apparatus ID "B012". The information processor 402 then references the fourth table of FIG. 8B and identifies the "recipe b", and the "recipe d" as the control information associated with the food information "chilled food b", the device type information "microwave oven b", and "oven d". The information processor 402 references the third table of FIG. 8A, and attaches the cooking apparatus ID "C022" associated with the terminal apparatus ID "B012" to the control information "recipe b". Similarly, the information processor 402 attaches the cooking apparatus ID "C024" associated with the terminal apparatus ID "B012" to the control information "recipe d".

In step S25, the information processor 402 transmits the control information with the cooking apparatus ID attached thereto via the information transceiver 401 to the terminal apparatus 100.

In step S26, the information transceiver 104 in the terminal apparatus 100 receives the control information and the cooking apparatus ID from the server apparatus 400. The information processor 105 stores the received control information and cooking apparatus ID in the memory 103.

The information processor 105 waits on standby to receive the terminal apparatus ID from the cooking apparatus 500. Within a predetermined period of time from the moment of the acquisition of the food information (step S21), the transmission of the food information (step S22), or the reception of the control information (step S26), the information processor 105 determines whether the cooking apparatus ID has been received. If the cooking apparatus ID has not been received within the predetermined period of time, the information processor 105 may send a notification via the notification unit 102 to prompt the user to cook using the cooking apparatus 500.

In step S27, the information processor 502 in the cooking apparatus 500 determines whether the detector 504 has detected a change (namely, whether a detected signal has been received from the detector 504).

If it is determined in step S27 that no change has been detected (no branch from step S27), processing returns to step S27. On the other hand, if it is determined that a change has been detected (yes branch from step S27), processing proceeds to step S28.

In step S28, the information processor 502 reads the cooking apparatus ID from the memory 503, and transmits the read cooking apparatus ID via the information transceiver 501 to the terminal apparatus 100.

In step S29, the information transceiver 104 in the terminal apparatus 100 receives the cooking apparatus ID of the cooking apparatus 500 transmitted from the cooking apparatus 500. The information processor 105 stores the received cooking apparatus ID in the memory 103.

In step S30, the information processor 105 searches the memory 103 for the same cooking apparatus ID as the cooking apparatus ID first received from the cooking apparatus 500, and reads the control information attached to the hit cooking apparatus ID. The information processor 105 transmits the read control information via the information transceiver 104 to the cooking apparatus 500. The control information is thus transmitted to the cooking apparatus 500 indicated by the first received cooking apparatus ID in this way. The control information is transmitted to the cooking apparatus the user intends to use even if multiple cooking apparatuses are registered and identified.

In step S31, the information transceiver 501 in the cooking apparatus 500 receives the control information transmitted from the terminal apparatus 100. The information processor 502 stores the received control information in the memory 503.

In step S32, the information processor 502 reads the control information from the memory 503, and performs a cooking operation in accordance with a cooking condition specified by the read control information.

In the cooking assisting system of the third embodiment, the terminal apparatus 100 transmits the control information acquired from the server apparatus 400 to the cooking apparatus 500 in response to the detection of a change in the cooking apparatus 500. The user thus transmits the control information to the cooking apparatus 500 without performing a manual operation on the terminal apparatus 100, and is thus fee from time needed to transmit the control information. This leads to optimum cooking based on the food information as expected by a food company or a cooking apparatus manufacturer.

Fourth Embodiment

A fourth embodiment of the disclosure is described below. In the third embodiment, the control information is transmitted from the server apparatus 400 to the cooking apparatus 500 via the terminal apparatus 100. In the fourth embodiment, the control information is directly transmitted from the server apparatus 400 to the cooking apparatus 500.

The cooking assisting system of the fourth embodiment of the disclosure is identical in configuration to the cooking assisting system of FIG. 7. The following discussion focuses on the difference from the third embodiment.

As illustrated in FIG. 7, the network 300 may be a radio network, a wired network, or a combination thereof. For example, the terminal apparatus 100 is connected to the server apparatus 400 via the Internet. The storage apparatus 200 is connected to the server apparatus 400 via the Internet.

The terminal apparatus 100 is different from the counterpart in the third embodiment is that the terminal apparatus 100 acquires the food information and transmits the acquired food information to the server apparatus 400. More specifically, the terminal apparatus 100 is free from the transmission and reception of the control information and the reception of the cooking apparatus ID.

The cooking apparatus 500 is different from the counterpart in the third embodiment is that the cooking apparatus 500 transmits the cooking apparatus ID to the server apparatus 400 and that the cooking apparatus 500 receives the control information from the server apparatus 400. More specifically, in the fourth embodiment, the cooking apparatus ID to be stored in the memory 503 is associated with the server apparatus ID of the server that serves as the transmission destination of the cooking apparatus ID. For example, it is assumed that the cooking apparatus ID of the cooking apparatus 500 is associated with the server apparatus ID of the server apparatus 400. Upon receiving a detected signal from the detector 504, the information processor 502 reads the cooking apparatus ID from the memory 503, and transmits the read cooking apparatus ID via the information transceiver 501 to the server apparatus 400. When the information transceiver 501 receives the control information transmitted from the server apparatus 400, the information processor 502 stores the received control information in the memory 503.

The server apparatus 400 is different from the counterpart in the third embodiment is that the server apparatus 400 receives the cooking apparatus ID from the cooking apparatus 500, and that the server apparatus 400 transmits the control information to the cooking apparatus 500. More specifically, in the fourth embodiment, upon receiving the food information and the terminal apparatus ID from the terminal apparatus 100, the information processor 402 waits on standby to receive the cooking apparatus ID. Upon receiving the cooking apparatus ID from the cooking apparatus 500, the information processor 402 stores the cooking apparatus ID in the memory 403. The information processor 402 reads from the memory 403 the food information, the terminal apparatus ID, the cooking apparatus ID, the third table (see FIG. 8A), and the fourth table (see FIG. 8B), and then identifies the control information to be transmitted to the cooking apparatus 500. The information processor 402 transmits the identified control information via the information transceiver 401 to the cooking apparatus 500 indicated by the cooking apparatus ID.

Figure 10:
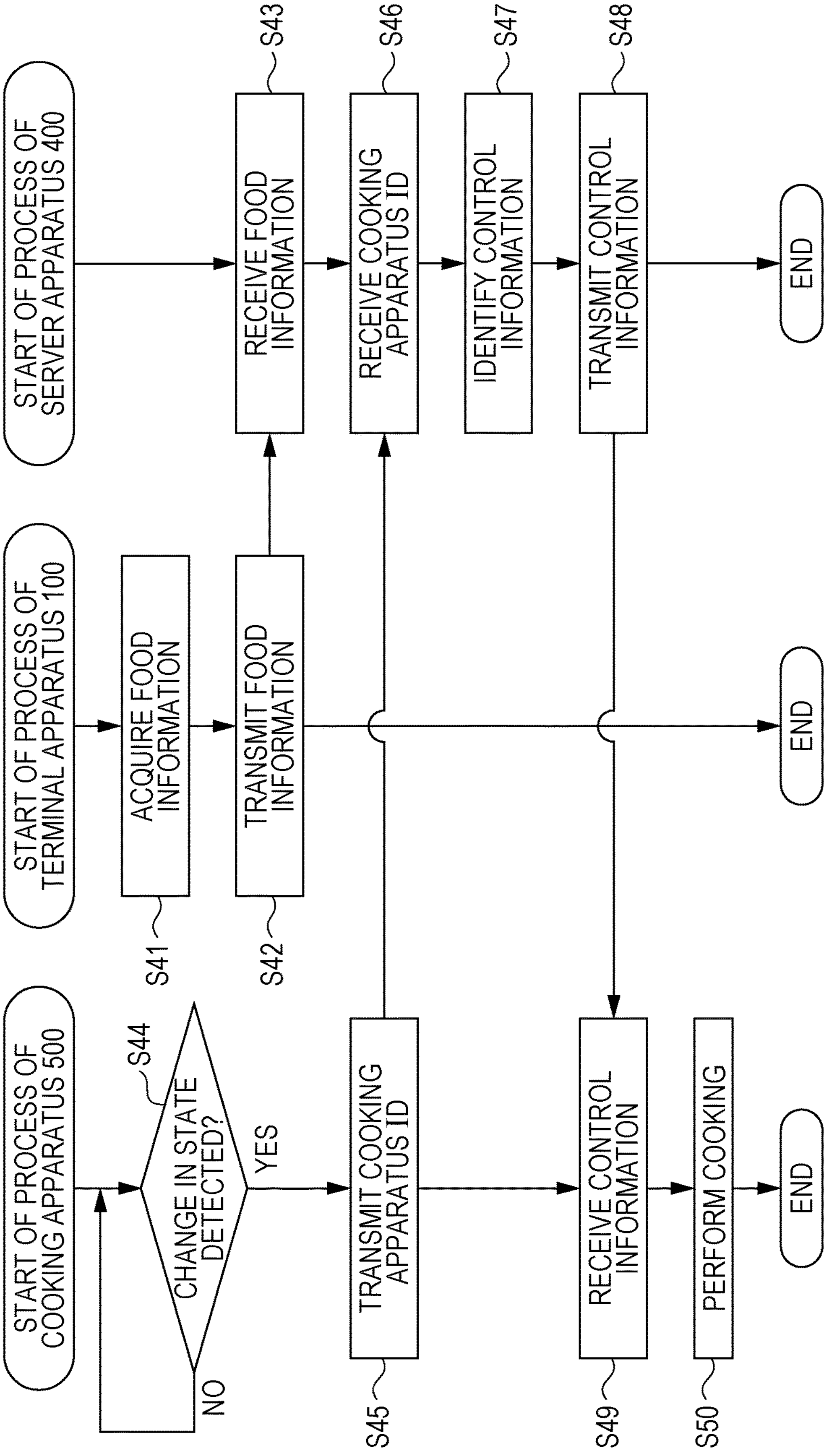
FIG. 10 is a sequence chart illustrating an example of an operation of the cooking assisting system of another embodiment of the disclosure.

An example of the cooking assisting process of the cooking assisting system of the fourth embodiment is described below. FIG. 10 is a sequence chart illustrating an example of the cooking assisting process of the cooking assisting system of the embodiment of the disclosure.

Steps S41 through S43 are respectively identical to steps S21 through S23 of FIG. 9, and the discussion thereof is thus omitted herein. Subsequent to step S43, the information processor 402 waits on standby to receive the cooking apparatus ID from the cooking apparatus 500. The information processor 402 may determine whether the cooking apparatus ID is received (step S46) within a predetermined period of time from the time point of the reception of the food information (step S43). If the cooking apparatus ID is not received within the predetermined period of time, the information processor 402 may generate information prompting the user to perform cooking using the cooking apparatus 500, and may transmit the generated information from the information transceiver 401 to the terminal apparatus 100. The terminal apparatus 100 notifies the user of the information via the notification unit 102.

Step S44 is identical to step S27 of FIG. 9, and the discussion thereof is omitted herein.

In step S45, the information processor 502 reads the cooking apparatus ID from the memory 503, and transmits the read cooking apparatus ID via the information transceiver 501 to the server apparatus 400.

In step S46, the information transceiver 401 in the server apparatus 400 receives the cooking apparatus ID transmitted from the cooking apparatus 500. The cooking apparatus ID received in step S46 is the first cooking apparatus ID subsequent to the reception of the food information in step S43. This is interpreted to mean that the cooking apparatus 500 is where a change is detected first in the state thereof, and is an apparatus that transmits the cooking apparatus ID to the server apparatus 400 after the information transceiver 401 receives the food information in step S43. The information processor 402 stores the received cooking apparatus ID in the memory 403.

In step S47, the information processor 402 reads from the memory 403 the food information, the terminal apparatus ID, the cooking apparatus ID, the third table, and the fourth table. The information processor 402 identifies the control information to be transmitted to the cooking apparatus 500, based on these pieces of information.

How to identify the control information is specifically described below.

For example, the terminal apparatus ID may be "B012", the food information may be the "chilled food b", and the cooking apparatus ID may be "C022". The information processor 402 references the third table of FIG. 8A, and identifies the "microwave oven b" as the device type information associated with the terminal apparatus ID "B012" and the cooking apparatus ID "C022". The information processor 402 then references the fourth table of FIG. 8B, and identifies the "recipe b" as the control information associated the food information "chilled food b" and the device type information "microwave oven b".

In step S48, the information processor 402 transmits the identified control information via the information transceiver 401 to the cooking apparatus 500.

In step S49, the information transceiver 501 in the cooking apparatus 500 receives the control information transmitted from the server apparatus 400. The information processor 502 stores the received control information in the memory 503.

In step S50, the information processor 502 reads the control information from the memory 503, and performs a cooking operation based on the cooking condition specified by the read control information.

The cooking assisting system of the fourth embodiment has similar advantageous effects as those of the third embodiment. In the cooking assisting system of the fourth embodiment, the terminal apparatus 100 is free from the transmission and reception of the control information, the reception of the cooking apparatus ID, and the searching of the control information. The fourth embodiment operates with a smaller memory area and less process load than the first embodiment.

Implementation Example of Computer Program

The functions of the terminal apparatus 100, the storage apparatus 200, the server apparatus 400, and the cooking apparatus 500 (hereinafter referred to as each apparatus) may be implemented using a computer program.

Figure 11:
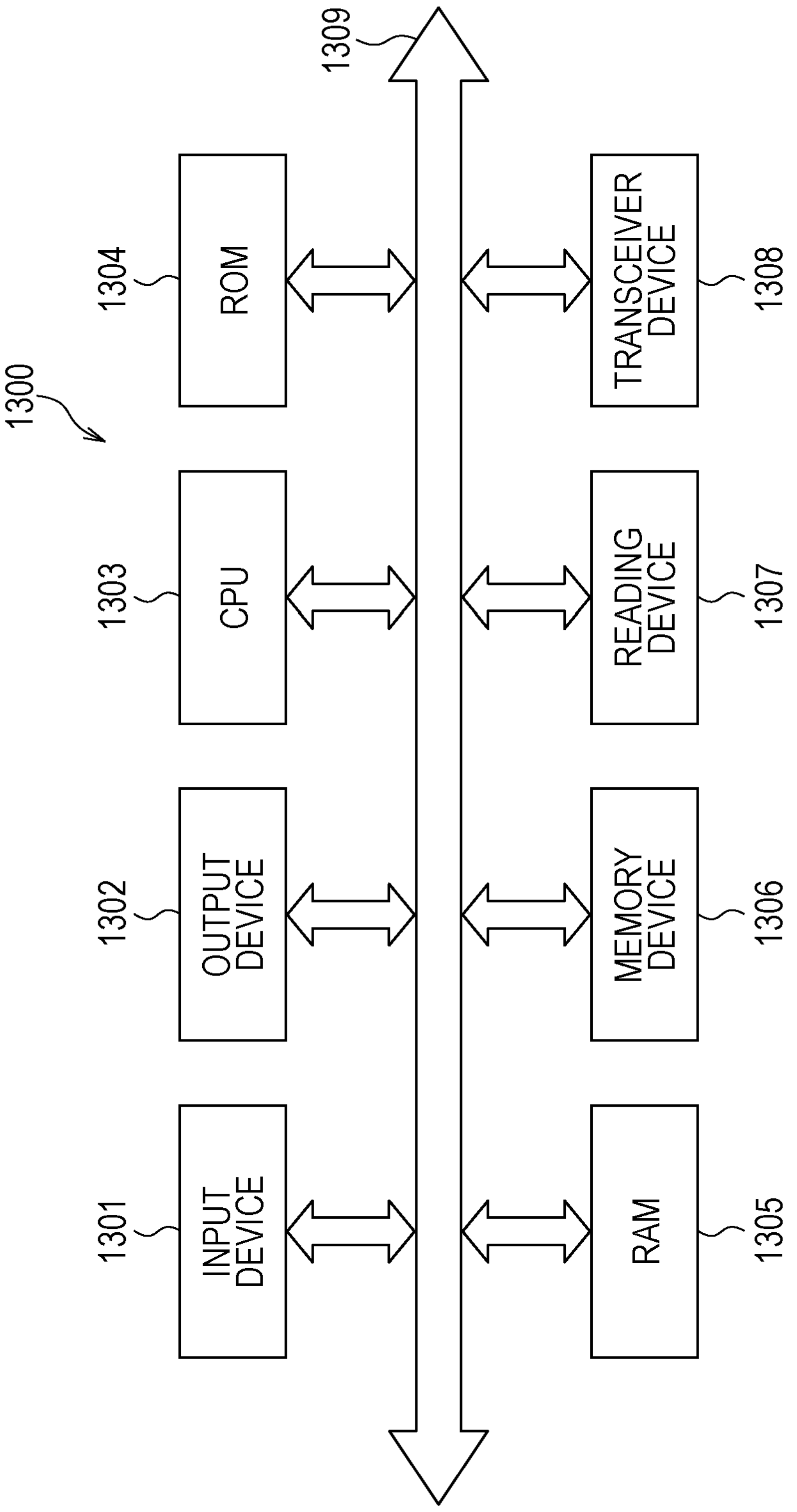
FIG. 11 illustrates an example of a hardware configuration of a computer that implements a function of an apparatus and a server apparatus of another embodiment of the disclosure using software.

FIG. 11 illustrates an example of the hardware configuration of a computer 1300 that implements the function of each apparatus using a computer program. The computer 1300 includes an input device 1301, such as a keyboard, a mouse, or a touchpad, an output device 1302, such as a display or a loudspeaker, a central processing unit (CPU) 1305, a read-only memory (ROM) 1304, a random-access memory (RAM) 1305, a memory device 1306, such as a hard disk device or a solid-state drive (SSD), a reading device 1307 configured to read information from a digital versatile disk read-only memory (DVD-ROM) or a universal serial bus (USB) memory, and a transceiver device 1308 performing communications via a network. These elements are interconnected via a bus 1309.

The reading device 1307 reads a program from a recording medium having stored the program implementing the function of each apparatus, and stores the program in the memory device 1306. Alternatively, the transceiver device 1308 communicates the server apparatus connected to the network, and then stores in the memory device 1306 a program that is downloaded from the server apparatus and implements the function of each apparatus.

The CPU 1303 copies the program stored in the memory device 1306 to the RAM 1305, and successively reads instructions contained in the copied program from the RAM 1305 and executes the instructions. The function of each apparatus is thus implemented.

Whole Picture of Provided Service

Figure 12A:
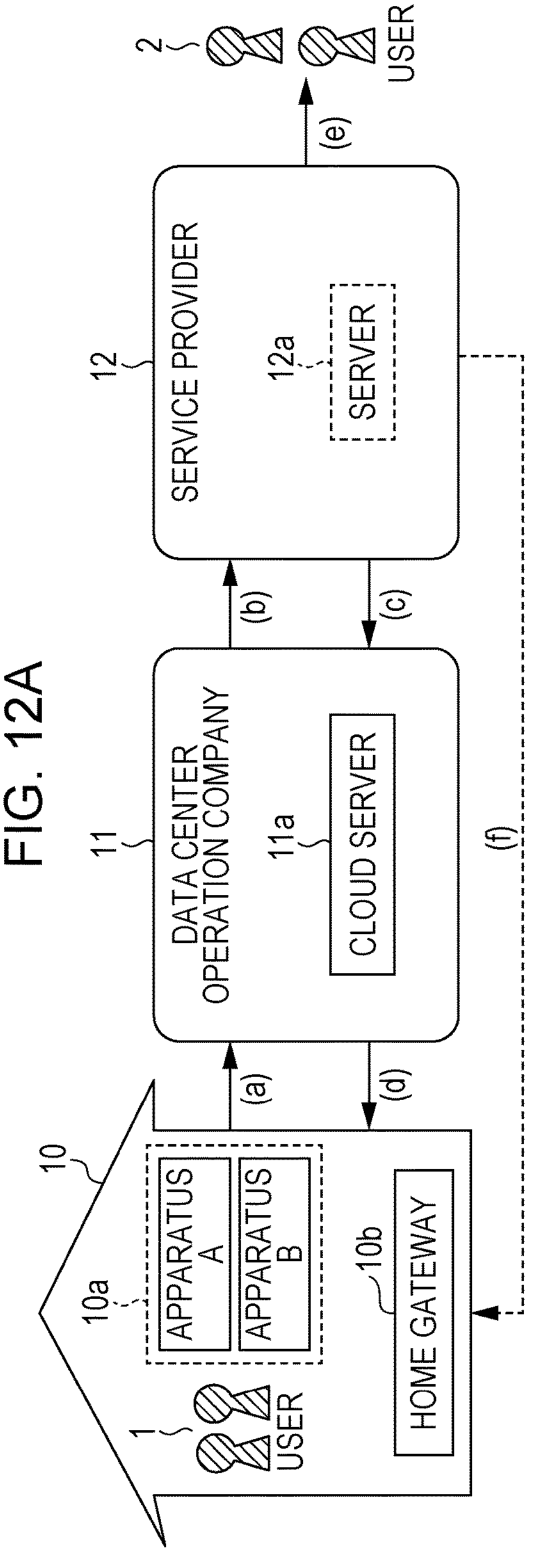
FIG. 12A diagrammatically illustrate the cooking assisting system of another embodiment of the disclosure.
Figure 12B:
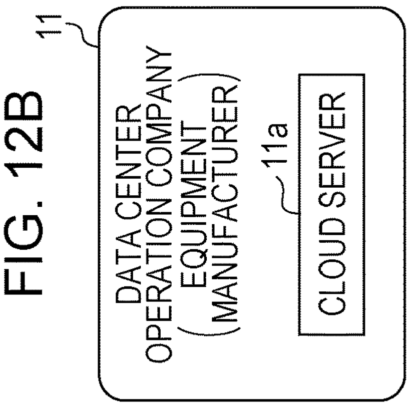
FIG. 12B illustrates an example of relationship between a data center operation company and an equipment manufacturer in the cooking assisting system of another embodiment of the disclosure.
Figure 12C:
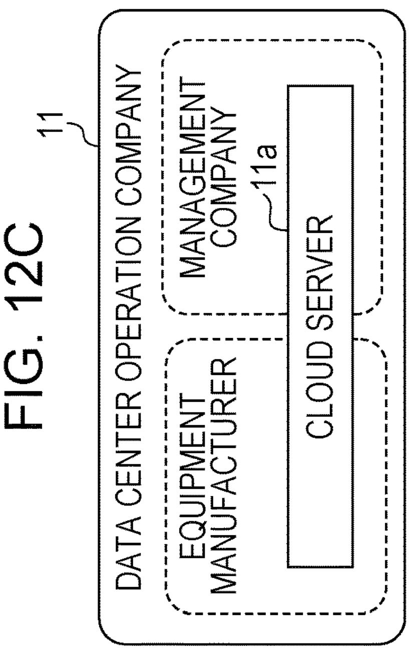
FIG. 12C illustrates an example of relationship among a data center operation company, an equipment manufacturer, and a management company in the cooking assisting system of another embodiment of the disclosure.

FIGS. 12A through 12C diagrammatically illustrate the cooking assisting system of the second through fourth embodiments of the disclosure. FIG. 12A illustrates the whole picture of the cooking assisting system of the second through fourth embodiments. A group 10 includes businesses, organizations, homes, and the like. The size of each business or organization does not matter. The group 10 also includes multiple pieces of equipment 10*a*, including apparatus A, and apparatus B, and a home gateway 10*b*.

The multiple pieces of equipment 10*a* include equipment that is connectable to the Internet (such as a smart phone, a personal computer (PC), and TV), and equipment that is not inherently connectable on its own to the Internet (such as lighting equipment, a washing machine, or a refrigerator). The multiple pieces of equipment that are not inherently connectable to the Internet may include equipment that may be connectable to the Internet via the home gateway 10*b*. The multiple pieces of equipment 10*a* include the terminal apparatus 100, the storage apparatus 200, and the cooking apparatus 500. Users 1 who use the multiple pieces of equipment 10*a* are also included in the group 10.

A data center operation company 11 includes a cloud server 11*a*. The cloud server 11*a* is a virtual server that cooperates with a variety of pieces of equipment via the Internet. The data center operation company 11 manages data and the cloud server 11*a*, and operates a data center thereof. The role of the data center operation company 11 is described in detail below.

The data center operation company 11 is not limited to a company that only manages data or operates the cloud server 11*a*. FIG. 12B illustrates an example of relationship between a data center operation company and an equipment manufacturer in the cooking assisting system of one embodiment of the disclosure. As illustrated in FIG. 12B, an equipment manufacturer having developed and manufactured one of the multiple pieces of equipment 10*a* may also manage data and the cloud server 11*a*. In such a case, the equipment manufacture is the data center operation company 11.

The data center operation company 11 is not limited to a single corporation. FIG. 12C illustrates an example of relationship among a data center operation company, an equipment manufacturer, and a management company in the cooking assisting system of one embodiment of the disclosure. As illustrated in FIG. 12C, the equipment manufacture and the management company may operate the cloud server 11*a* in cooperation with each other or with roles thereof divided. In such a case, both or either of the equipment manufacture and the management company corresponds to the data center operation company 11.

A service provider 12 includes a server 12*a*. The server 12*a* corresponds to the server apparatus 400. The server 12*a* may include a memory of a PC of an individual and the size of the server 12*a* does not matter. The service provider 12 may not necessarily include the server 12*a*.

The home gateway 10*b* is not necessarily used in the service. For example, if the cloud server 11*a* manages all data, the home gateway 10*b* becomes unnecessary. Also, for example, all pieces of equipment at home may be connected to the Internet. In such a case, there is no equipment that is not inherently connectable to the Internet.

The flow of information in the service is described. Apparatus A and apparatus B in the group 10 respectively transmit log information to the cloud server 11*a* in the data center operation company 11. The cloud server 11*a* collects information of the equipment A and the equipment B (information flow (a) of FIG. 12A).

The log information indicates an operation status or operation time and date of the multiple pieces of equipment 10*a*. For example, the log information includes a viewing log of television, programmed recording information of a recorder, operation time and date of a washing machine and a amount of washing, opening time and date of a refrigerator, and the number of openings of the refrigerator. The log information is not limited to these pieces of information. The log information also includes a variety of pieces of information received by the server apparatus 400 in the second through fourth embodiments (such as the storage apparatus ID, the food information, the terminal apparatus ID, and the cooking apparatus ID).

The log information may be directly transmitted from the multiple pieces of equipment 10*a* to the cloud server 11*a* via the Internet. Optionally, the log information may be collected by the home gateway 10*b* from the multiple pieces of equipment 10*a* and may then be transmitted from the home gateway 10*b* to the cloud server 11*a*.

The cloud server 11*a* in the data center operation company 11 transmits the collected information to the service provider 12 by a unit of fixed amount. The unit of fixed amount may be a unit by which the data center operation company 11 arranges and provides the collected information in order to transmit the collected information to the service provider 12, or may be a unit the service provider 12 has requested. The unit of fixed amount may not be necessarily fixed, and may be varied depending on the situation.

The log information may be stored on the server 12*a* owned by the service provider 12 as appropriate (information flow (b) of FIG. 12A). The service provider 12 arranges the log information in order into information adapted to the service provided to the user (such as the startup information or the control information), and then provides the resulting information to the user. The user may be the user 1 who uses the multiple pieces of equipment 10*a* or an external user 2.

In the service providing method to the user, the service provider 12 directly provides the information to the user (information flows (e) and (f) of FIG. 12A). In another service providing method, the information is provided to the user via the cloud server 11*a* in the data center operation company 11 again (information flows (c) and (d) of FIG. 12A). The cloud server 11*a* in the data center operation company 11 may arrange the log information in order to information adapted to the service provided to the user, and then transmits the information to the service provider 12.

The user 1 and the user 2 may be different persons or the same person.

Types of Cloud Service

The technique discussed with reference to the second through fourth embodiments may be implemented in the cloud service of the following types. The technique discussed with reference to the second through fourth embodiment is not limited to the service types described below.

First Service Type (In-House Data Center Type)

Figure 13:
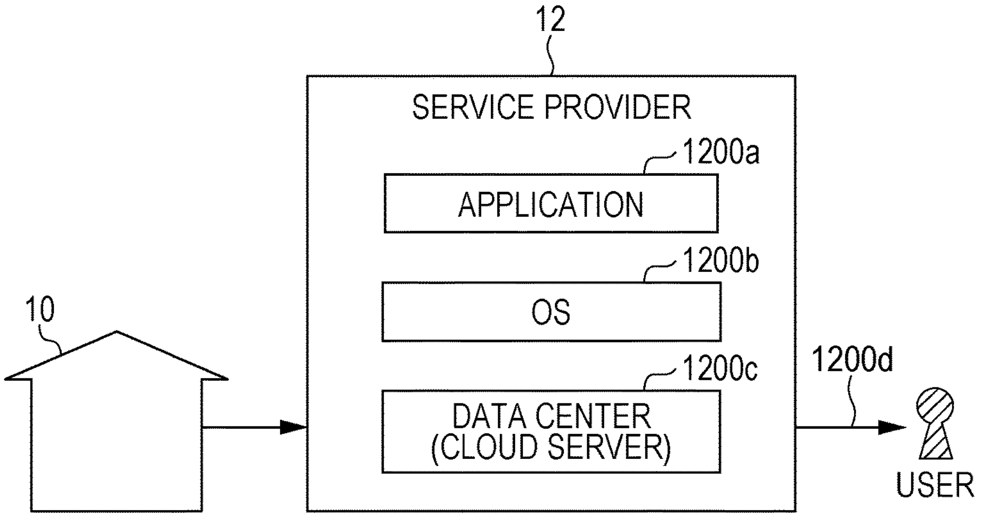
FIG. 13 illustrates an example of a first service type (in-house data center type) of another embodiment of the disclosure.

FIG. 13 illustrates an example of a first service type (in-house data center type) of an embodiment of the disclosure. In the first service type, the service provider 12 acquires information from the group 10 and provides a service to the user. In the first service type, the service provider 12 functions as the data center operation company 11. More specifically, the service provider 12 includes the cloud server 11*a* configured to manage big data. No data center operation company 11 is thus present in the first service type.

In the first service type, the service provider 12 operates and manages a data center (the cloud server 11*a*) (1200*c*). The service provider 12 also manages an operating system (OS) (1200*b*) and an application (1200*a*). The service provider 12 provides the service using the OS (1200*b*) and the application (1200*a*) managed thereby (1200*d*).

Second Service Type (IaaS Based Type)

Figure 14:
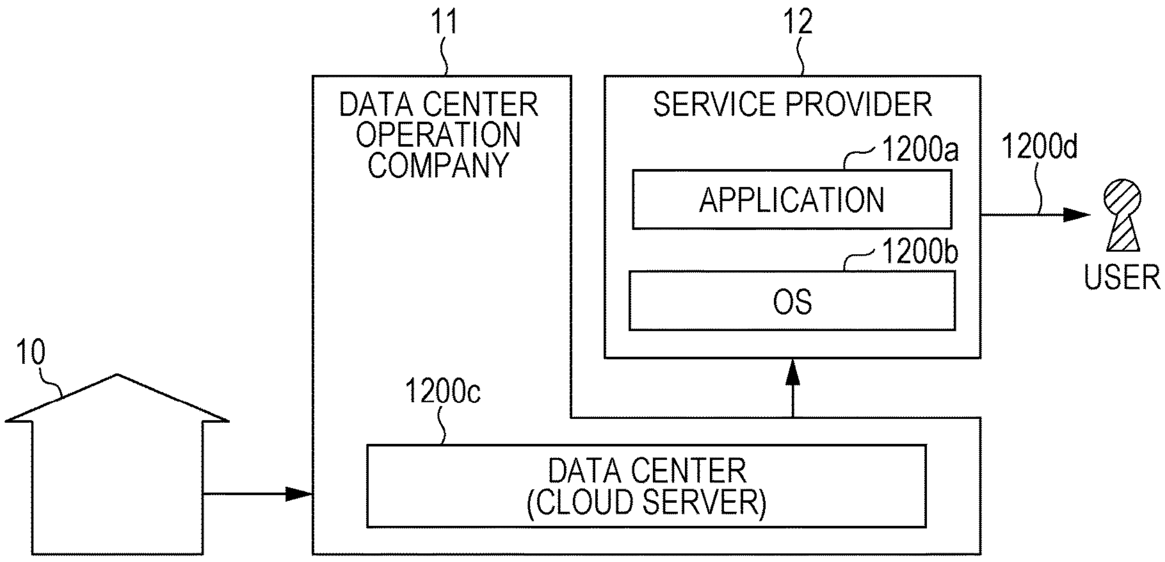
FIG. 14 illustrates an example of a second service type (IaaS based type) of another embodiment of the disclosure.

FIG. 14 illustrates an example of a second service type (IaaS based type) of an embodiment of the disclosure. IaaS stands for infrastructure as a service, and is a cloud service providing model in which a base where a computer system is constructed and operated is provided as a service over the Internet.

In the second service type, the data center operation company operates and manages a data center (the cloud server 11*a*) (1200*c*). The service provider 12 manages the OS (1200*b*), and the application (1200*a*). The service provider 12 provides a service using the OS (1200*b*) and the application (1200*a*) managed thereby (1200*d*).

Third Service Type (PaaS Based Type)

Figure 15:
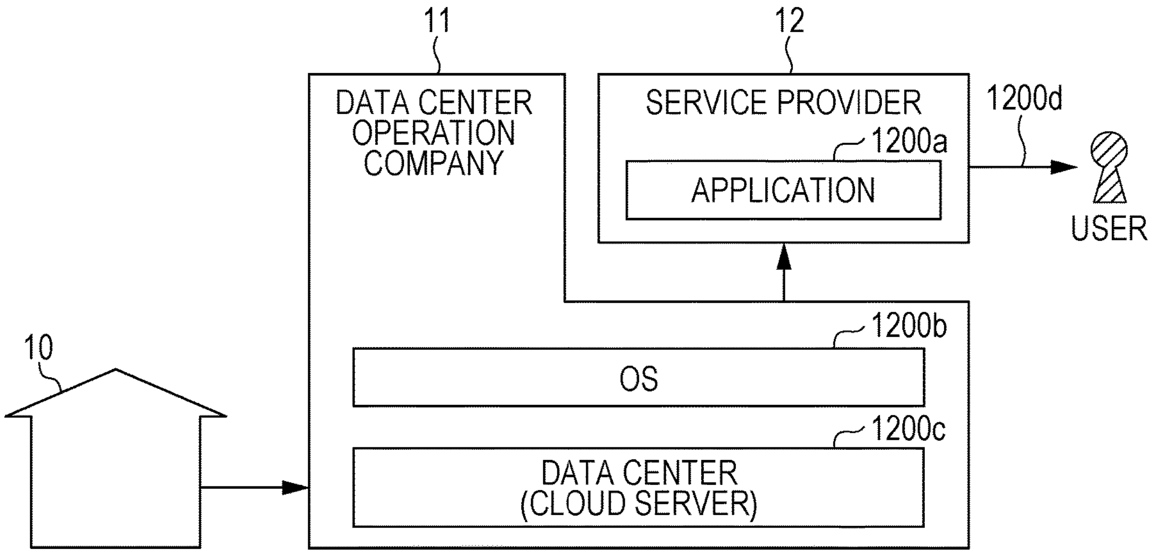
FIG. 15 illustrates an example of a third service type (PaaS based type) of another embodiment of the disclosure.

FIG. 15 illustrates an example of a third service type (PaaS based type) of an embodiment of the disclosure. PaaS stands for platform as a service, and is a cloud service providing model in which a platform serving as a base where software is constructed and operated is provided as a service over the Internet.

In the third service type, the data center operation company 11 manages the OS (1200*b*), and operates and manages the data center (the cloud server 11*a*) (1200*c*). The service provider 12 also manages the application (1200*a*). The service provider 12 provides a service using the OS (1200*b*) managed by the data center operation company 11 and the application (1200*a*) managed by the service provider 12 (1200*d*).

Fourth Service Type (SaaS Based Type)

Figure 16:
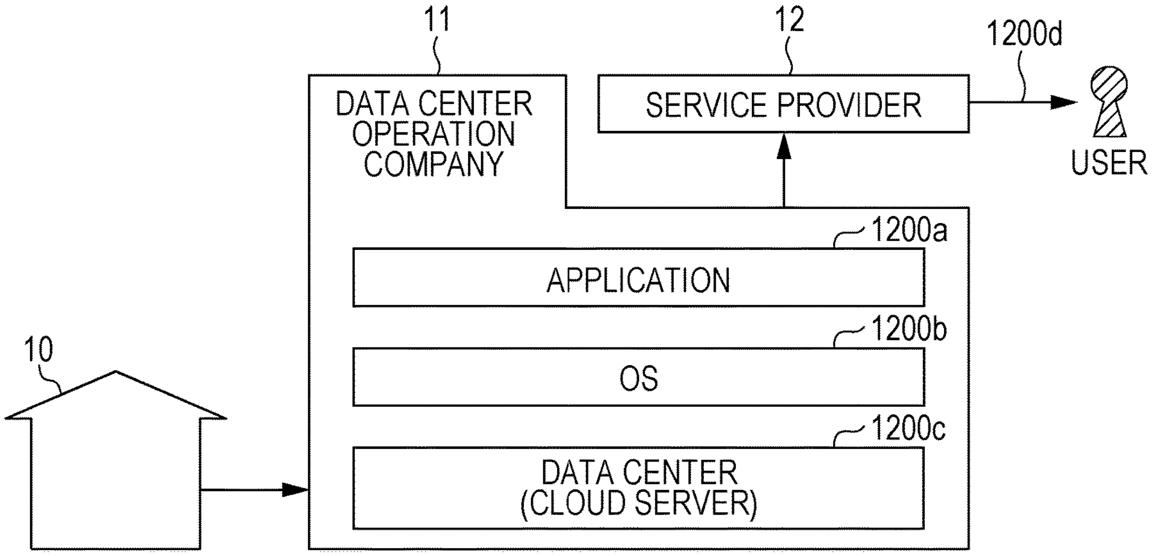
FIG. 16 illustrates an example of a fourth service type (IaaS based type) of another embodiment of the disclosure.

FIG. 16 illustrates an example of a fourth service type (SaaS based type) of an embodiment of the disclosure. SaaS stands for software as a service, and is a cloud service model. The cloud service model has a function in which a company or an individual (user) having no data center (cloud server) may use via a network, such as the Internet, an application provided by a platform provider having a data center (cloud server).

In the fourth service type, the data center operation company 11 manages the application (1200*a*), and the OS (1200*b*), and operates and manages the data center (the cloud server 11*a*) (1200*c*). The service provider 12 provides a service using the OS (1200*b*) and the application (1200*a*) managed by the data center operation company 11 (1200*d*).

In each of the service types, the service provider 12 performs a service providing action. The service provider or the data center operation company may develop the OS, the application or a database of big data, or may outsource the development of the OS, the application or the database of big data.

The first through fourth embodiments of the disclosure have been described. The embodiments of the disclosure are not limited to those heretofore described. Modifications of the embodiments are described below.

First Modification

In the third and fourth embodiments, the storage apparatus 200 is used in place of the cooking apparatus 500. In such a case, the control information is used to control the storage of food in the storage apparatus 200 (such as information indicating a storage temperature and a storage condition). In the first and second embodiments, the cooking apparatus 500 may be used in place of the storage apparatus 200. If a predetermined change is detected in the cooking apparatus 500 in such a case, the cooking apparatus ID is transmitted to one of the terminal apparatus 100 and the server apparatus 400. In the third and fourth embodiments, the server apparatus 400 is employed in the same way as in the second embodiment. A server apparatus different from the server apparatus of the second embodiment may be used for the server apparatus in the third and fourth embodiments.

Second Modification

In the third embodiment, the terminal apparatus 100 transmits the food information to the server apparatus 400 upon acquiring the food information. The disclosure is not limited to this arrangement. For example, the terminal apparatus 100 may wait on standby to receive the cooking apparatus ID from the cooking apparatus 500 subsequent to the acquisition of the food information. Upon receiving the cooking apparatus ID, the terminal apparatus 100 transmits to the server apparatus 400 the received cooking apparatus ID, the food information, and the terminal apparatus ID. The server apparatus 400 identifies the control information based on these pieces of information and the third and fourth tables. The identification process is identical to the identification process of the fourth embodiment.

Third Modification

In the first and second embodiments, the detector 204 in the storage apparatus 200 detects a change. The disclosure is not limited to this arrangement in each of the first and second embodiments. For example, the detector 204 may be a camera configured to detect a change in an image of the inside of the storage apparatus 200 (an example of the change). In such a case, upon detecting the change in the image of the inside of the storage apparatus 200, the detector 204 determines that food has been taken out, and outputs the detected signal to the information processor 202.

Fourth Modification

In the first through fourth embodiments, an apparatus having the food information acquisition function is the terminal apparatus 100, such as a smart phone or a tablet. The disclosure is not limited to this arrangement. For example, the food information acquisition function may be implemented in the storage apparatus 200, the cooking apparatus 500, or a device separate therefrom (such as a microphone, or a camera installed at a predetermined location in a kitchen). The device implementing the food information acquisition function may be a terminal wearable by the human body. The wearable terminal may be a head-mount display terminal (hereinafter referred to as a glass-like terminal). The glass-like terminal includes a display, an eyesight camera, a near-ear speaker, a near-mouth microphone, and the like.

The glass-like terminal, if used in one of the first and second embodiments, operates as below. The user wearing the glass-like terminal (an example of the terminal apparatus 100) may take out frozen food by opening the door of the refrigerator (an example of the storage apparatus 200), and the glass-like terminal starts up a food information acquisition application (an example of the food information acquisition function).

If the food information acquisition application is configured to identify food from an image which the food information acquisition application photographs through a camera, the food information of the frozen food is acquired when the user takes a position to make the eyesight camera to look toward the frozen food. If the food information acquisition application is configured to identify food from a voice, the food information of the frozen food is identified when the user says the name of the frozen food to the near-mouth microphone.

The glass-like terminal, if used in one of the third and fourth embodiments, operates as described below. For example, the user may look at a microwave oven the user wants to cook the frozen food with, and the eyesight camera may photograph the microwave oven for a predetermined period of time or longer. The glass-like terminal may transmit the food information and the terminal apparatus ID to the microwave oven photographed by the eyesight camera. Alternatively, the user may approach a microwave oven the user wants to cook the frozen food with, and the distance between the glass-like terminal and the microwave oven may be found to be a fixed value or shorter (in accordance with the intensity of radio wave or using a distance sensor). The glass-like terminal then transmits the food information and the terminal apparatus ID to the microwave oven. As another example, if the user takes a particular action in front of the eyesight camera (for example, points toward a desired microwave oven), the glass-like terminal may transmit the food information and the terminal apparatus ID to that microwave oven. If the user says to the near-mouth microphone the name of a microwave oven the user wants to cook the frozen food with, the glass-like terminal may identify the microwave oven by recognizing the voice of the user, and transmit the food information and the terminal apparatus ID to the identified microwave oven.

Fifth Modification

In the third and fourth embodiments, the control information is transmitted to the single cooking apparatus 500. Alternatively, the control information may be transmitted multiple cooking apparatuses 500. The food indicated by the food information may be cooked through a recipe in which the food is to be heated in an oven after being thawed in a microwave oven. The terminal apparatus 100 or the server apparatus 400 identifies multiple pieces of control information associated with the food information. The terminal apparatus 100 or the server apparatus 400 transmits the identified multiple pieces of control information to each of the microwave oven and the oven. The transmission of the control information may be performed to the multiple cooking apparatuses at a time or may be performed each time the cooking apparatus ID is received from each cooking apparatus. In the fifth modification, a single food item is cooked using the multiple cooking apparatuses, and the user may transmit the control information to the cooking apparatus 500 without performing any manual operation. The user is thus free from the manual operation step to transmit the multiple pieces of control information.

Sixth Modification

In the third and fourth embodiments, a single piece of device type information may be associated with multiple pieces of control information. The terminal apparatus 100 or the cooking apparatus 500 (or the storage apparatus 200) having received these pieces of information may display these pieces of information to allow the user to select one piece of information. In the fifth modification, the user may cook using a desired type of cooking apparatus.

Seventh Modification

In the first and third embodiments, the terminal apparatus 100 serving as the transmission destination of the storage apparatus ID is pre-registered in the storage apparatus 200. The disclosure is not limited to this arrangement. If multiple terminal apparatuses 100 are present in the nearby area of the storage apparatus 200, the storage apparatus 200 may transmit the storage apparatus ID to all the terminal apparatuses 100 or some of the terminal apparatuses 100. The following method may be used to select some of the terminal apparatuses 100 to which the storage apparatus 200 transmits the storage apparatus ID. The storage apparatus 200 may select the terminal apparatus 100 close in distance thereto by referencing physical location information, radio-wave strength, or whether the terminal apparatus 100 is inside or outside a building. The storage apparatus 200 may determine whether the user is likely to cook based on ownership information of the terminal apparatus 100 (information related to the user of the terminal apparatus 100), and may then select the terminal apparatus 100 of the user who is determined to be likely to cook. Furthermore, the storage apparatus 200 may select the terminal apparatus 100 according to how high performance is, such as a screen size or processing throughput.

Eighth Modification

In the second and third embodiments, the terminal apparatus 100 serving as the transmission destination of the startup information or the control information is pre-registered in the server apparatus 400. The disclosure is not limited to this arrangement. If multiple terminal apparatuses 100 are present in the area of a kitchen, the server apparatus 400 checks the registered location information of the kitchen against the location information of the terminal apparatus 100, identifies the terminal apparatus 100 closest to the kitchen based on the two pieces of location information, and transmits the startup information or the control information to the identified terminal apparatus 100.

Ninth Modification

In the first through fourth embodiments, the food taken out of the storage apparatus 200 for cooking in the cooking apparatus 500 may be frozen food. In this case, cooking time may be optimized as described below. A ninth modification is herein based on the premise that the operation performed in the first embodiment may be followed by the operation in the third embodiment. Upon detecting the opening of the door of the storage apparatus 200, the storage apparatus 200 transmits the storage apparatus ID to the terminal apparatus 100. Upon receiving the storage apparatus ID from the storage apparatus 200, the terminal apparatus 100 measures time elapse from the reception of the storage apparatus ID to the reception of a signal that indicates the start of heating of the cooking apparatus 500. The operation herein is based on the premise that the cooking apparatus 500 transmits the signal indicating the start of heating at the moment the cooking apparatus 500 starts to heat. The terminal apparatus 100 acquires measurement results of the room temperature of the kitchen using a room temperature measurement function thereof (not illustrated) or from another room temperature measurement device (not illustrated). The terminal apparatus 100 calculates appropriate heating time in accordance with the time elapse, the measurement results of the room temperature, and a fifth table acquired from a predetermined server. The fifth table is data that is predetermined on a food item basis. In the fifth table, the heating time is defined in accordance with the room temperature and the time elapse. The heating time is set to be shorter as the room temperature is higher and the time elapse is longer. The terminal apparatus 100 modifies the heating time included in the control information identified by the server apparatus 400 to the calculated heating time. The terminal apparatus 100 transmits the modified control information to the cooking apparatus 500. In the ninth modification, cooking may be performed in the appropriate cooking time accounting for the degree of thaw during the period from when the frozen food is taken out of the storage apparatus 200 to the start of heating in the cooking apparatus 500. In the above discussion, the terminal apparatus 100 calculates the heating time. Alternatively, the server apparatus 400 may calculate the heating time (if the operation of the second embodiment is followed by the operation of the fourth embodiment).

Tenth Modification

If the food information acquisition function is the camera application in the third and fourth embodiments, a food item is photographed by the camera application, an image recognition process is performed on the image of the photographed food, and the food information associated with the image recognized food item is acquired. In a tenth modification, the image recognition process of the food item, once image-recognized, may be simplified for the second time. For example, once a first image recognition process is performed on a predetermined food item, the terminal apparatus 100 stores the features of that food item (such as color, and shape). If the stored features are contained in a photographed image in a next image recognition process, the terminal apparatus 100 determines that the current food item is similar to the previously image recognized one, and then acquires the food information. Since the tenth modification is free from the repeated operations of image recognition of the photograph image on similar food item, the processing speed of the terminal apparatus 100 is increased.

Eleventh Modification

In the third and fourth embodiments, the fourth table lists multiple pieces of control information with respect to a single piece of device type information. In such a case, the multiple pieces of control information may be transmitted to a single apparatus (a storage apparatus or a cooking apparatus) to control the apparatus. For example, multiple pieces of control information may be registered on a predetermined type of refrigerator (possibly including a freezing compartment). The multiple pieces of control information may be configured so that different storage temperatures are set in different compartments (storage sections). Upon receiving multiple pieces of control information (storage temperature) from the terminal apparatus 100 or the server apparatus 400, the refrigerator controls the storage compartments to the temperatures thereof. In this way, a cooling compartment, a vegetable compartment, and a freezing compartment are controlled to their own different cooling temperatures. In this way, multiple spacings in the refrigerator (such as an upper shelf spacing, an intermediate shelf spacing, and a lower shelf spacing) are controlled to their own cooling temperatures. The multiple cooling temperatures may be used separately, or the mean value of the cooling temperatures may be used, or one of the cooling temperatures (for example, the lowest temperature) may be used. In an eleventh modification, the refrigerator is controlled. A cooking apparatus for heating may be controlled in a similar fashion.

The disclosure finds applications in a terminal apparatus for cooking assistance, and a control method of the terminal apparatus.

What is claimed is:

1. A terminal apparatus in communication with a food handling apparatus that keeps in storage or that cooks food, the terminal apparatus comprising:

a memory that stores a table that associates identification information of the food handling apparatus with device information indicating a device included in the terminal apparatus, the device being capable of acquiring food information related to the food;

an information receiver that receives the identification information of the food handling apparatus transmitted from the food handling apparatus if a predetermined change is detected in the food handling apparatus; and an information processor that causes the memory to store the identification information of the food handling apparatus received by the information receiver, wherein the information processor reads from the memory the identification information of the food handling apparatus and the table, identifies the device included in the terminal apparatus and indicated by the device information associated with the identification information of the food handling apparatus received by the information receiver in accordance with the table, and causes the identified device to acquire the food information.

2. The terminal apparatus according to claim 1, wherein the device is a barcode reader, a camera, or a microphone.

3. A terminal apparatus in communication with a first server apparatus, the terminal apparatus comprising:

an information receiver that receives startup information transmitted from the first server apparatus, the startup information indicating a function of the terminal apparatus to be started up, the first server apparatus storing a table that associates identification information of a food handling apparatus with a function to be started by a terminal apparatus, the food handling apparatus for keeping in storage or cooking food; and an information processor that causes a memory to store the startup information received by the information receiver, wherein the information processor reads the startup information from the memory, and starts up the function in accordance with the startup information, wherein the startup information is generated, by the first server apparatus, as information causing the information processor of the terminal apparatus to execute starting up the function, and wherein the function to be started up in the terminal apparatus is identified by the first server apparatus, the identified function is associated with the identification information, in the table, which corresponds to identification information transmitted from the food handling apparatus to the first server apparatus if a predetermined change is detected in the food handling apparatus.

4. The terminal apparatus according to claim 3, wherein the function to be started up in the terminal apparatus includes a function to acquire food information related to the food.

5. The terminal apparatus according claim 4, further comprising an information transmitter that transmits to the first server apparatus the food information acquired through the function, wherein the first server apparatus uses the food information to identify control information to control an operation of the food handling apparatus, and wherein the first server apparatus transmits the control information via the terminal apparatus or directly to the food handling apparatus.

6. The terminal apparatus according claim 4, further comprising an information transmitter that transmits to a second server apparatus the food information acquired through the function, wherein the second server apparatus uses the food information to identify control information to control an operation of the food handling apparatus, and wherein the second server apparatus transmits the control information via the terminal apparatus or directly to the food handling apparatus.

7. A control method of a terminal apparatus communicating with a food handling apparatus that keeps in storage or that cooks food, the control method comprising:

storing in a memory in the terminal apparatus a table that associates identification information of the food handling apparatus with device information indicating a device included in the terminal apparatus, the device being capable of acquiring food information related to the food;

receiving the identification information of the food handling apparatus transmitted from the food handling apparatus if a predetermined change is detected in the food handling apparatus;

causing the memory to store the received identification information of the food handling apparatus;

reading from the memory the identification information of the food handling apparatus and the table;

identifying the device included in the terminal apparatus and indicated by the device information associated with the received identification information of the food handling apparatus in accordance with the table; and causing the identified device to acquire the food information.

8. A control method used in a terminal apparatus in communication with a first server apparatus, the control method comprising:

receiving startup information transmitted from the first server apparatus, the startup information indicating a function of the terminal apparatus to be started up, the first server apparatus storing a table that associates identification information of a food handling apparatus with a function to be started by a terminal apparatus, the food handling apparatus for keeping in storage or cooking food;

storing, in a memory, the startup information received by the receiving; and reading the startup information from the memory, and starting up the function in accordance with the startup information, wherein the startup information is generated, by the first server apparatus, as information causing a processor of the terminal apparatus to execute starting up the function, and wherein the function to be started up in the terminal apparatus is identified by the first server apparatus, the identified function is associated with the identification information, in the table, which corresponds to identification information transmitted from the food handling apparatus to the first server apparatus if a predetermined change is detected in the food handling apparatus.

* * * * *